United States Patent
Au et al.

(10) Patent No.: US 8,223,626 B2
(45) Date of Patent: Jul. 17, 2012

(54) LINEAR PRECODING FOR MIMO CHANNELS WITH OUTDATED CHANNEL STATE INFORMATION IN MULTIUSER SPACE-TIME BLOCK CODED SYSTEMS WITH MULTI-PACKET RECEPTION

(75) Inventors: Edward Kwok Shum Au, Hong Kong (CN); Jane Wei Huang, Vancouver (CA); Vincent Kin Nang Lau, Hong Kong (CN)

(73) Assignee: Yim Tu Investments Ltd., LLC, Wilmington, DE (US)

( * ) Notice: Subject to any disclaimer, the term of this patent is extended or adjusted under 35 U.S.C. 154(b) by 1222 days.

(21) Appl. No.: 11/972,980

(22) Filed: Jan. 11, 2008

(65) Prior Publication Data

US 2009/0180454 A1 Jul. 16, 2009

(51) Int. Cl.
*H04J 11/00* (2006.01)
(52) U.S. Cl. .................. 370/208; 370/334; 370/342
(58) Field of Classification Search .............. 370/208, 370/334, 342
See application file for complete search history.

(56) References Cited

U.S. PATENT DOCUMENTS

| | | | | |
|---|---|---|---|---|
| 3,879,664 A | * | 4/1975 | Monsen | 375/232 |
| 6,792,106 B1 | * | 9/2004 | Liu | 379/406.05 |
| 7,961,807 B2 | * | 6/2011 | Kotecha et al. | 375/267 |
| 8,023,987 B2 | * | 9/2011 | Boche et al. | 455/522 |
| 2002/0098838 A1 | * | 7/2002 | Ikeda et al. | 455/423 |
| 2004/0196921 A1 | * | 10/2004 | Matsumoto et al. | 375/285 |
| 2006/0109897 A1 | * | 5/2006 | Guo et al. | 375/232 |
| 2007/0218950 A1 | | 9/2007 | Codreanu et al. | |
| 2008/0130777 A1 | * | 6/2008 | Landau et al. | 375/267 |
| 2009/0034636 A1 | * | 2/2009 | Kotecha et al. | 375/260 |
| 2009/0082052 A1 | * | 3/2009 | Bhushan et al. | 455/522 |

OTHER PUBLICATIONS

Calamai, Paul et al. "Projected gradient methods for linearly constrained problems" Mathematical Programming, vol. 39, Issue 1, Sep. 1, 1987, p. 93-116.*
Huang, J. W et al., "Linear Precoding for Space-Time Coded MIMO Systems using Partial Channel State Information", 2006 IEEE International Symposium on Information Theory, Seattle, WA, Jul. 9-14, 2006 (Sep. 7, 2006), pp. 391-395.

(Continued)

*Primary Examiner* — Dang Ton
*Assistant Examiner* — Robert M Morlan
(74) *Attorney, Agent, or Firm* — Turocy & Watson, LLP

(57) ABSTRACT

A joint set of linear precoder designs is provided for single cell uplink multiuser space-time block coded multiple-input multiple-output (MIMO) systems with multi-packet reception by exploiting outdated channel state information. By deriving the pairwise error probability with respect to both minimum and average codeword distance design metrics, the technique solves an optimization problem subject to transmit power constraint for each user and dependent on the outdated channel state information. Due to the non-convex nature of the optimization problem, an iterative technique based on alternating minimization and projected gradient can be used to solve for a joint linear preceding structure for general space-time block coding. The linear precoding structure is then sent from the base station to various consumer premise equipment for use in later transmissions. For orthogonal space-time block code, a simplified distributed technique is provided to solve for a closed-form solution of the optimization problem.

40 Claims, 16 Drawing Sheets

OTHER PUBLICATIONS

Huang, J.W. et al., "Linear Precoder and Equalizer Design for Uplink Multiuser MIMO Systems with Imperfect Channel State Information", Wireless Communications and Networking Conference, 2007. WCNC 2007. IEEE, Kowloon, Mar. 11-15, 2007, pp. 1296-1301.

Hayes, R., Jr. et al., "Dispersive covariance codes for MIMO precoding", Global Telecommunications Conference, 2005. Globecom '05. IEEE, vol. 3, Nov. 28-Dec. 2, 2005 (Nov. 28, 2005-Feb. 12, 2005), pp. 1466-1470.

International Search Report & Written Opinion dated Jun. 22, 2009 for PCT Application Serial No. PCT/IB2009/005015, 9 pages.

* cited by examiner

LINEAR PRECODING FOR MIMO CHANNELS WITH OUTDATED CHANNEL STATE INFORMATION IN MULTIUSER SPACE-TIME BLOCK CODED SYSTEMS WITH MULTI-PACKET RECEPTION

TECHNICAL FIELD

The subject disclosure relates generally to wireless communications systems, and more particularly to precoder designs for multiuser space-time block coded systems with multi-packet reception.

BACKGROUND OF THE INVENTION

Wireless communication networks are increasingly popular and widely deployed. Conventionally, however, wireless communication allows a single transmission at a given frequency at the same time. Thus, frequency/time division duplexing is used to allow multiple users to transmit information in a wireless communication network. However, this leads to a reduced data rate for a given channel bandwidth.

Multiple-input multiple-output (MIMO) technology is a promising candidate for next-generation wireless communications. In order to achieve a high data rate over MIMO channels, space-time codes, which perform coding across both spatial and temporal dimensions, can be utilized to maximize possible diversity and coding advantages without sacrificing channel bandwidth. However, channel state information (CSI) is not required in space-time code design.

In traditional frequency/time division duplex systems where CSI can be fed back/estimated, CSI can actually be exploited for optimum or quasi-optimum precoder and equalizer designs with the purpose of maximizing system performance. Nonetheless, since CSI is not required in space-time codes, often only limited CSI information can be available and/or the CSI can be outdated due to feedback delay. Consequently, CSI is traditionally not exploited to optimize precoder or equalizer designs in space-time coded MIMO channels.

The above-described deficiencies of wireless network communications are merely intended to provide an overview of some of the problems of today's wireless networks, and are not intended to be exhaustive. Other problems with the state of the art may become further apparent upon review of the description of various non-limiting embodiments that follows.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

A joint set of linear precoder designs is provided for single cell uplink multiuser space-time block coded multiple-input multiple-output (MIMO) systems with multi-packet reception (MPR) by exploiting outdated channel state information (CSI). By deriving the pairwise error probability (PEP) with respect to both minimum and average codeword distance design metrics, an optimization problem is derived subject to transmit power constraint for each user and dependent on the outdated channel state information. Due to the non-convex nature of the optimization problem, an iterative technique based on alternating minimization and projected gradient algorithm can be used to solve for a linear preceding structure for general space-time block code (STBC). The linear preceding structure is then sent from the base station (BS) to various consumer premise equipments (CPEs).

For orthogonal space-time block code (OSTBC), a simplified distributed technique is provided to solve for a closed-form solution. According to one aspect of the simplified distributed technique, the linear preceding matrices are instead derived at each of the CPEs. Thus, resources are saved and are available for other purposes.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
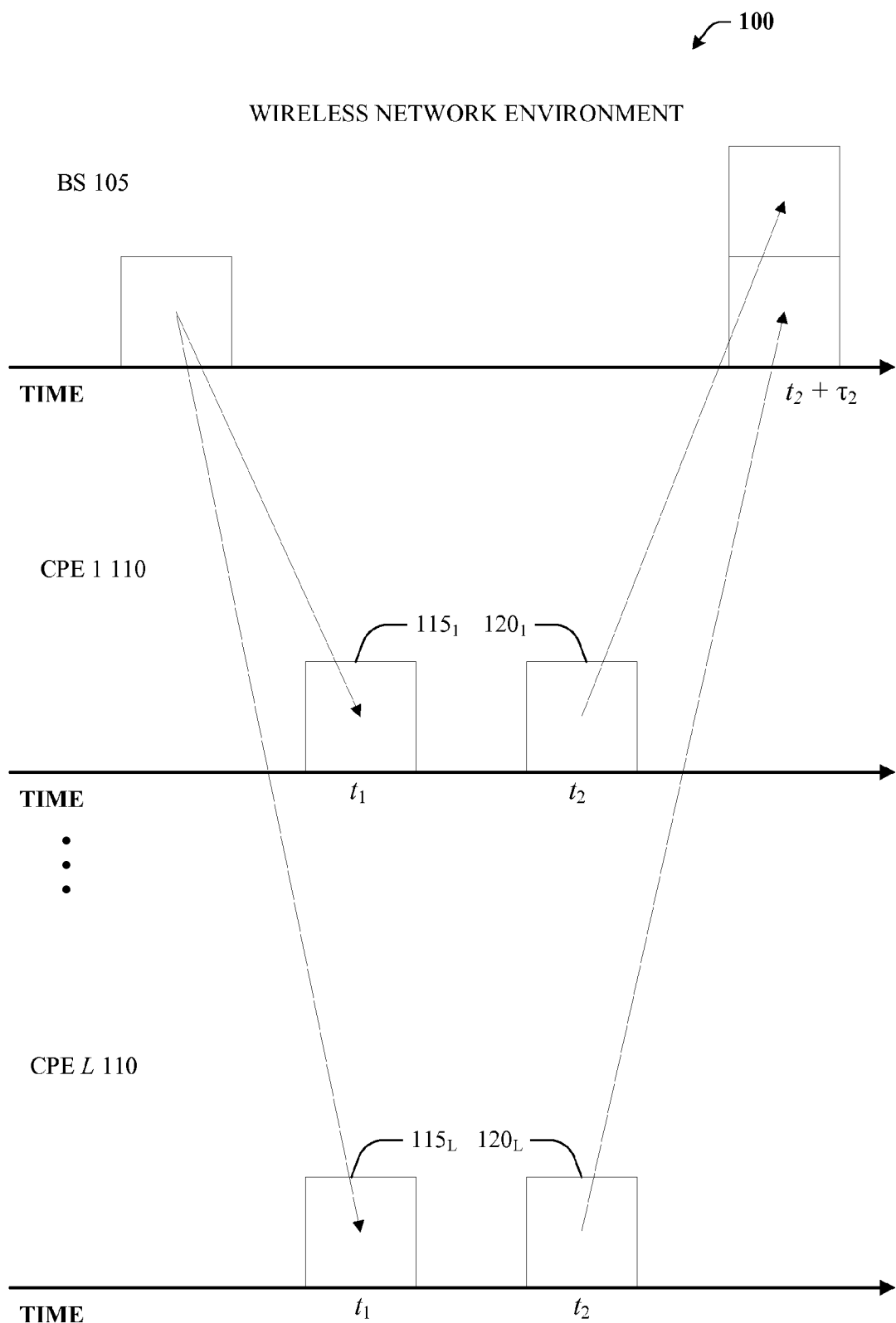
FIG. 1 is a diagram of an exemplary wireless communication network in which the aspects can be implemented.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The combination of STBC and channel precoding can make a wireless communication system robust against channel fading while achieving both coding and diversity gains. A joint set of linear precoder design for uplink multiuser space-time block coded system, as well as a distributed precoder design for orthogonal STBC, is provided by exploiting outdated CSI.

The linear precoder design is determined as a solution to an optimization problem for minimizing pairwise error probability (PEP) subject to a transmit power constraint for each user (e.g, each consumer premise equipment (CPE)). Since that optimization problem turns out to be non-convex over all precoder matrices, an iterative technique is provided to solve the optimization problem for general STBC. The disclosed technique works for both minimum and average codeword distance design metrics.

In light of an attractive property of average distance design criterion, a simplified technique is provided for a closed-form linear preceding structure for orthogonal STBC (OSTBC). When the quality of the outdated CSI is very good, the closed-form linear precoder approaches a single-eigenmode beamformer that allocates all transmit power to the strongest eigenmode. On the other hand, a precoder with poor channel quality tends to perform beamforming on all eigenmodes with equal power allocation.

In accordance with one aspect, an exemplary wireless network environment 100 is a single cell uplink multiuser space-time block coded system where there are L number of consumer premise equipments (CPEs) communicating synchronously with a base station (BS) in a MIMO-STBC system with multi-packet reception (MPR). One skilled in the art will appreciate that, despite the name, CPEs can be mobile devices.

As illustrated in FIG. 1, all CPEs 110 are scheduled by the BS 105 to transmit packets $120_{1-L}$ in the same time slot $t_2$. When users are scheduled by the base station for packet transmission, perfect symbol level synchronization can occur among all users. However, it is worth mentioning that the above-mentioned synchronization can be achieved in practice by using dedicated timing and access intervals. For example, symbol level synchronization for uplink OFDMA in WiMAX is achieved by uplink ranging in IEEE 802.16e.

Although not shown, the BS is typically connected to another network, such as the Internet, public telephone network, or private networks and communicates data received from the CPEs to this network and also transmits data from the network back to the CPEs.

In one aspect, precoding matrices $\{F_i \in C^{M_{Ti} \times M_{Ti}}\}_{i=1}^{L}$ $115_{1-L}$ are designed at the BS and sent to the respective CPEs through a dedicated feedback link at $t_1$ while the CPEs start packet transmission at $t_2$. At the end of the slot with some predictable delays, say $t_2+\tau_2$, the BS 105 gathers all of the L packets $120_{1-L}$ for channel estimation, data detection, and precoder design for CPEs. For the sake of clarity, without loss of generality, all packets are assumed to have the same length and each time slot equals one packet duration.

Figure 2:
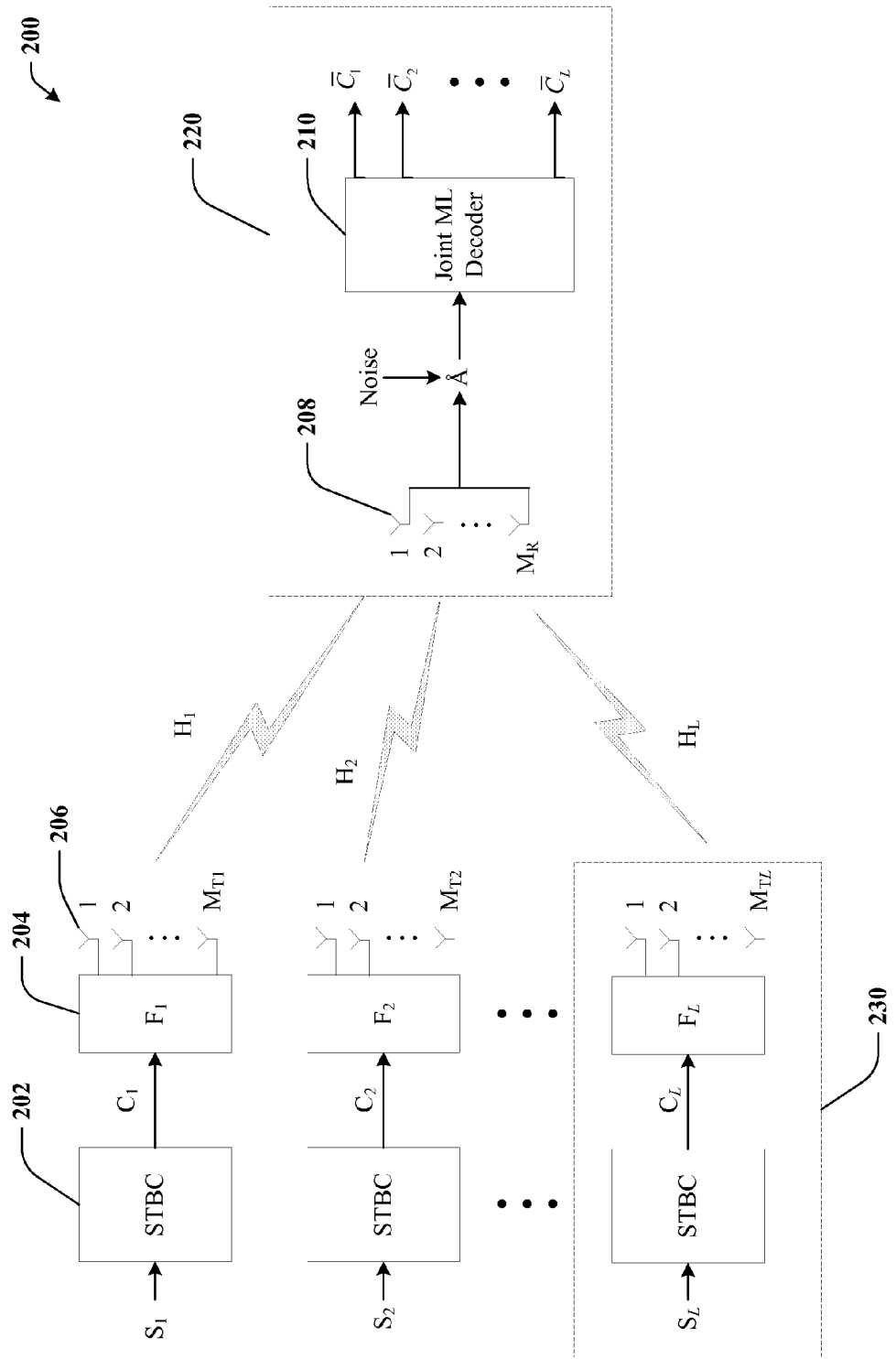
FIG. 2 is a diagram of transmissions in a wireless communication network according to one aspect.

Referring to FIG. 2, the BS 220 has $M_R$ receive antennas 208 and the i-th CPE 230 has $M_{T_i}$ transmit antennas 206, where i=1, . . . , L. The BS 220 uses a joint maximum likelihood decoder 210 to decode received data. The block fading channel from the i-th CPE to the BS is modeled as a $M_R \times M_{T_i}$ matrix $H_i$ that follows the complex Gaussian distribution with mean $M_{H_i} \in C^{M_R \times M_{Ti}}$ and covariance $\Sigma_{H_i H_i} \in C^{M_T \times M_{Ti}}$.

Each MIMO channel is assumed to be correlated at CPEs but fully uncorrelated at the receiver side. In particular, since rich scattering at a CPE exists which results in a larger angle spread, the antenna of a CPE needs to be separated by, say $\lambda/2$, for uncorrelated fading. Yet, due to space limitations and RF coupling in small embedded devices (e.g., the CPE), it is difficult to maintain completely uncorrelated antennas at the CPE. However, although the angular spread at the base station is smaller (e.g., ~30 degrees for urban environment), the base station can afford to separate antennas by larger distance (e.g., $10\lambda$ or more) and hence, it is easier to achieve uncorrelated fading at the base station side.

Thus, it is better performance-wise to have further separated antennas at the base station to create more degrees of freedom in the MIMO channels. The degrees of freedom can be used for diversity, especially when the CSI at the transmitter (CSIT) is poor, or spatial multiplexing. In any case, performance will be improved with further separated antenna at the base station.

Let $C_i$ be a $M_{T_i} \times T$ codeword generated from the i-th space-time encoder 202, which maps the i-th CPE's transmitted signal vector $S_i \in C^{T \times 1}$ into $C_i$. The codeword is processed by a linear precoder $F_i$ 204. Such a system setup not only helps adopt the codeword to various kinds of channel conditions, but also inherits all implementation advantages of non-precoded space-time block coded systems since both the STBC and the detection algorithm remain unchanged. Denote $N \in C^{M_R \times T}$ as additive white Gaussian noise whose entries are zero mean complex Gaussian with variance $\sigma_n^2$. The received symbol matrix $R \in C^{M_R \times T}$ is given by $$R = \sum_{i=1}^{L} H_i F_i C_i + N. \qquad \text{(Equation 1)}$$

Since channel estimates can be obtained with much higher accuracy at the receiver, perfect CSI at the receiver (CSIR) is assumed for simplicity. However, in other embodiments, channel estimation error can be included during the course of precoder design.

Denote $H \triangleq [H_1, \ldots, H_L]$, $F \triangleq \text{diag}\{F_1, \ldots, F_L\}$ and $C \triangleq [C_1^T, \ldots, C_L^T]^T$, where $(\bullet)^T$ is the matrix transpose. A joint maximum-likelihood (ML) decoder is employed to compute the decision metric and decide in favor of the codeword with the minimum metric.

$$\{\hat{C}_1, \ldots, \hat{C}_L\} = \arg_{c_1 \in c, \forall i} \min \|R - HFC\|_F^2 \qquad \text{(Equation 2)}$$

where $\hat{C}_i$ is the estimate of $C_i$, C is the STBC codebook and $\|\bullet\|_F$ represents the Frobenius norm.

Although perfect CSIR is available, outdated CSI can be exploited in the precoder design due to feedback delay. Consider a scenario where all precoding matrices $\{F_i\}_{i=1}^{L}$ are jointly designed at the BS based on the CSI at time slot $t_1$, namely $H(t_1)$, and the CPEs are scheduled for packet transmission at $t_2 > t_1$. Because of the feedback delay, $H(t_2)$ is generally different from $H(t_1)$, which implies that when the CPEs transmit the packets, the precoders designed at the BS have been outdated. In the following, an approach is provided in which the outdated CSI from the i-th CPE to the BS is represented by a $M_R \times M_{T_i}$ matrix $\hat{H}_i$ with mean $M_{\hat{H}_i}$ and covariance $\Sigma_{\hat{H}_i \hat{H}_i}$ that are perfectly known at the BS. Define $\hat{H} \Delta [\hat{H}_1, \ldots, \hat{H}_L]$, and $M_{H|\hat{H}}$ as the channel mean matrix of instantaneous channel H conditioned on the outdated CSI $\hat{H}_i$.

Based on the assumption that $H_i$ and $\hat{H}_i$ are jointly Gaussian for all i, $\Sigma_{HH|\hat{H}} \Delta \text{diag}\{\Sigma_{H_1 H_1|\hat{H}_1}, \ldots, \Sigma_{H_L H_L|\hat{H}_L}\}$, which is the covariance matrix of H conditioned on $\hat{H}_i$, can be used for measuring channel uncertainly. In particular, when $\Sigma_{HH|\hat{H}} \to 0$, the quality of the outdated CSI approaches the perfect channel state information, and the precoders designed at the BS are closely matched with the channels during which the CPEs start packet transmission.

The problem of minimizing the pairwise error probability however is subject to a transmit power constraint for each CPE. In particular, two design criteria are indicated for selecting an appropriate codeword distance product metric for objective functions and for formulating a linear precoder design as an optimization problem.

The PEP is defined as an error probability of choosing in favor of the nearest codeword $\overline{C} = [\overline{C}_1^T, \ldots, \overline{C}_L^T]^T$ instead of the actual transmitted codeword C. The PEP between C and $\overline{C}$ is mathematically written as $$Pr(C \to \overline{C}|H,\hat{H}) = Pr(\|R-HFC\|_F^2 > \|R-HF\overline{C}\|_F^2|C,H,\hat{H}). \quad \text{(Equation 3)}$$

Averaging Equation 3 over ergodic realizations of H and applying the Chernoff bound yields:

$$Pr(C \to \overline{C}|\hat{H}) \le E_H\left\{\exp\left[-\frac{1}{4\sigma_n^2} tr\{HFA(C,\overline{C})F^*H^*\}\right]\right\}. \quad \text{(Equation 4)}$$

where $(\bullet)^*$ is the complex conjugate transpose operator and $A(C,\hat{C})$ is the codeword distance product metric.

In the succeeding function, the Chernoff bound in Equation 4 is considered as an objective function of the linear precoder according to one aspect.

Objective Function 1. For every realization of the conditional channel mean matrix $M_{H|\hat{H}}$ and the conditional covariance matrix $\Sigma_{HH|\hat{H}}$, a joint set of linear precoding matrices $\{F_i\}_{i=1}^L$ is determined such that the Chernoff bound in Equation 5 below can be minimized, $$\{F_i\}_{i=1}^L \le \arg\min_{\{F_i\}_{i=1}^L} E_H\left\{\exp\left[-\frac{1}{4\sigma_n^2} tr\{HFA(C,\overline{C})F^*H^*\}\right]\right\}. \quad \text{(Equation 5)}$$

The conditional PEP in Objective Function 1 can be highly dependent on both the transmitted codeword C and the misdecoded codeword $\hat{C}$ through the codeword distance product metric $A(C,\hat{C})$. Two distance metrics are considered, namely minimum distance design and average distance design.

The largest PEP conditioned on $\hat{H}$ is the dominant term at a high signal-to-noise ratio (SNR). Thus, a search is made for the codeword pairs C and $\hat{C}$ that gives the smallest value of $A(C,\hat{C})$ $$A_{min}(C,\overline{C}) = \arg\min_{C,\overline{C} \in \mathcal{C}} (C-\overline{C})(C-\overline{C})^*. \quad \text{(Equation 6)}$$

For general STBC, the number of combinations is exponentially proportional to the total number of CPEs. However when OSTBC is considered, Equation 6 can be simplified as $A_{min}(C,\hat{C}) = (d_m/P_S)I_{M_TT}$ where $d_m$ is the minimum distance in the signal constellation and $P_S$ is the average symbol power. In this case, the complexity is reduced and it is only linearly proportional to L.

Substituting $A_{min}(C,\hat{C})$ into Equation 5 yields the Chernoff bound of the conditional maximum PEP. This upper bound can be utilized, in at least some embodiments, to derive a joint set of linear precoders so as to minimize precoding gain.

In another embodiment, an average preceding gain is used to derive a joint set of linear precoders. In particular, average preceding gain is based on the covariance of the codeword error resulting from averaging the products of all possible codeword pairs, $$A_{ave}(C,\overline{C}) = \frac{1}{T} E[(C-\overline{C})(C-\overline{C})^*]. \quad \text{(Equation 7)}$$

Consider a scenario where the codewords of different CPEs are independent with one another, i.e., $E\{(C_i - \hat{C}_i)(C_j - \hat{C}_j)^*\} = 0$ for $i \ne j$, the codeword distance product metric can be simplified as the following block diagonal matrix $$A_{ave}(C,\overline{C}) = \frac{1}{T}\begin{bmatrix} A_1(C_1,\overline{C}) & \cdots & 0 \\ \vdots & \ddots & \vdots \\ 0 & \cdots & A_L(C_L,\overline{C}_L) \end{bmatrix} \quad \text{(Equation 8)}$$

where $A_i(C_i,\overline{C}_i) \Delta E\{(C_i-\hat{C}_i)(C_i-\hat{C}_i)^*\}$. Due to the fact that each of the i-th space-time precoders only acts on one column of the codeword at a time, and detection is performed jointly over the whole code-block of symbol periods, the equation above can be simplified as $$A_i(C_i,\overline{C}_i) \stackrel{\Delta}{=} E\{(C_i - \overline{C}_i)(C_i - \overline{C}_i)^*\} = \frac{1}{T}\sum_{m \ne n} p_{i,m,n} \Delta_{i,m,n} \Delta_{i,m,n}^*$$

where $\Delta_{i,m,n} = C_{i,m} - C_{i,n}$ and $p_{i,m,n}$ is the probability of the pair $C_{i,m}$ and $C_{i,n}$ among all pairs of distinct codewords of the i-th space-time encoder. Therefore, $A_{ave}(C,\overline{C})$ is practically obtained as long as $p_{i,m,n}$ is known for all pairs of the distinct codewords.

Although this embodiment does not provide the minimum precoding gain of the other embodiment, $A(C,\hat{C})$ is a tractable block diagonal matrix in this embodiment, which allows the derivation of a closed-form linear precoding structure.

After an appropriate codeword distance product metric $A(C,\hat{C})$ has been chosen, the joint linear precoder is formulated as an optimization problem. Based on the assumption that both H and $\hat{H}$ are jointly Gaussian, the probability density function of H given $\hat{H}$ follows the complex Gaussian distribution $$f_{H|\hat{H}}(H|\hat{H}) = \frac{\exp\left[-tr\left\{(H - M_{H|\hat{H}})^* \sum_{H|\hat{H}}^{-1} (H - M_{H|\hat{H}})\right\}\right]}{\pi^{M_T M_R} \det(\Sigma_{HH|\hat{H}})^{M_R}} \quad \text{(Equation 9)}$$

where $M_T = \Sigma_{i=1}^L M_{T_i}$ is the sum of transmit antennas of all CPEs. By substituting Equation 9 into Equation 5, the conditional upper-bounded PEP is expressed as $$P(C \to \overline{C} \mid \hat{H}) \leq \frac{\det\left(\sum_{HH|\hat{H}}\right)^{M_R}}{\det(W(F, C, \overline{C}))^{M_R}} \quad \text{(Equation 10)}$$

$$\exp\left[tr\left\{M_{H|\hat{H}}\left(W(F, C, \overline{C})^{-1} - \sum_{HH|\hat{H}}^{-1}\right)(M^*)_{H|\hat{H}}\right\}\right]$$

where $$W(F, C, \overline{C}) = \frac{1}{4\sigma_n^2}\sum_{HH|\hat{H}} FA(C, \overline{C})F^* \sum_{HH|\hat{H}} + \sum_{HH|\hat{H}}. \quad \text{(Equation 11)}$$

Note that when there is only one CPE, Equation 10 is equivalent to the upper-bounded PEP of a single-user MIMO-STBC system. Thus, Equation 10 is a generalization to multiple users. By taking the logarithm on both sides of Equation 10 and neglecting those terms that are independent of F, Objective Function 1 can be simplified as follows.

Objective Function 2. For every realization of $M_{H|\hat{H}}$ and $\Sigma_{HH|\hat{H}}$, a set of linear preceding matrices $\{F_i\}_{i=1}^L$ is designed such that the objective function in Equation 12 is minimized $$\{F_i\}_{i=1}^L = \arg\min_{\{F_i\}_{i=1}^L} l(F, C, \overline{C}) \quad \text{(Equation 12)}$$

$$= \arg\min_{\{F_i\}_{i=1}^L} \{tr\{M_{H|\hat{H}}W(F, C, \overline{C})^{-1}M_{H|\hat{H}}^*\} - M_R\text{logdet}(W(F, C, \overline{C}))\}.$$

The first term in Equation 12 depends on the actual realization of the channel estimate via $M_{H|\hat{H}}$ while the second term depends only on the codeword pairs via $W(F,C,\hat{C})$. Nevertheless, the joint linear precoder design can be mathematically modeled as the following optimization problem.

Optimization Problem 1. For every realization of $M_{H|\hat{H}}$ and $\Sigma_{HH|\hat{H}}$, a set of linear precoders $\{F_i\}_{i=1}^L$ is chosen such that the objective function in Equation 13 is minimized subject to the transmit power constraint for each CPE as expressed in Equation 14 as follows.

$$\min_{\{F_i\}_{i=1}^L} : l(F, C, \overline{C}) = \quad \text{(Equation 13)}$$

$$tr\{M_{H|\hat{H}}W(F, C, \overline{C})^{-1}M_{H|\hat{H}}^*\} - M_R\text{logdet}(W(F, C, \overline{C}))$$

subject to: $tr\{F_iF_i^*\} = P_i, i = 1, \ldots, L$ \quad \text{(Equation 14)} with $P_i$ being the transmit power for the i-th CPE.

Due to the nonlinear nature of $FA(C,\hat{C})F^*$ in $W(F,C,\hat{C})$, Optimization Problem 1 is not jointly convex over F and therefore, certain algorithms such as interior point methods cannot be used for solving the problem directly. Thus, in one embodiment, an iterative technique is employed to solve for the joint set of linear precoding matrices. The resulting precoding matrices are suitable for any STBC implementation.

According to the iterative technique, alternating minimization is employed such that a set of variables are optimized one at a time while keeping all the other variables fixed. For a joint formulation of linear precoders, alternating minimization starts with a given set of precoding structures, and then is updated using the following Optimization Problem in a parallel fashion Optimization Problem 2. Given the preceding matrices $F_j$ of those L−1 CPEs, where j≠i, a linear precoder $F_i$ is chosen for every realization of $M_{H|\hat{H}}$ and $\Sigma_{HH|\hat{H}}$ such that the objective function in Equation 15 is minimized subject to the transmit power constraint as follows:

$$\min_{F_i} : l(F, C, \overline{C}) = \quad \text{(Equation 15)}$$

$$tr\{M_{H|\hat{H}}W(F, C, \overline{C})^{-1}M_{H|\hat{H}}^*\} - M_R\text{logdet}(W(F, C, \overline{C}))$$

subject to: $tr\{F_iF_i^*\} = P_i$. \quad \text{(Equation 16)}

For the above optimization problem, a modified version of a standard unconstrained gradient algorithm is used as a projected gradient algorithm to take into account the transmit power constraint for each CPE.

Denote $F_i^{(l)}$ as the i-th linear precoder at iteration l and $F^{(l)} \triangleq \text{diag}\{F_1^{(l)}, \ldots, F_L^{(l)}\}$. Further denote d as the step size that is chosen for guaranteeing the convergence of the algorithm. An iteration is defined as $$F_i^{(l+1)} = \left[F_i^{(l)} - \frac{\sqrt{P_i}}{d}\frac{\nabla_{F_i^{(l)}}^* l(F^{(l)}, C, \overline{C})}{\sqrt{\left\|\nabla_{F_i^{(l)}} l(F^{(l)}, C, \overline{C})\right\|_F^2}}\right]_\perp \quad \text{(Equation 17)}$$

where $\nabla$ represents the matrix-valued nabla operator and $[\bullet]_\perp$ is the projection onto the transmit power constraint for the i-th CPE over $F_i^{(l+1)}$.

The gradient, $\nabla_{F_i^{(l)}} l(F^{(l)},C,\hat{C})$, is computed using the Karush-Kuhn-Tucker (KKT) optimality conditions of Optimization Problem 2, and subsequently the derived gradient is projected onto the transmit power constraint set. In particular, by introducing the Lagrangian multiplier constant $\mu_i \geq 0$ for the i-th CPE and taking the first order differentiation with respect to $F_i^{(l)}$ for Equations 15 and 16, it can be shown that (Equation 18)

$$\mu_i F_i^{(l)} = \nabla_{F_i}(F^{(l)}, C, \overline{C}) =$$

$$\frac{1}{2\sigma_n^2}E_i\Sigma_{HH|\hat{H}}\left(W(F^{(l)}, C, \overline{C})^{-1}M_{H|\hat{H}}^*M_{H|\hat{H}}W(F^{(l)}, C, \overline{C})^{-1} + \right.$$

$$\left. M_RW(F^{(l)}, C, \overline{C})^{-1}\right)\times\Sigma_{HH|\hat{H}}F^{(l)}A(C, \overline{C})E_i^T$$

where $E_i=[0, \ldots, I_{M_{T_i}}, \ldots, 0]$ is the basis matrix of size $M_{T_i} \times M_T L$.

Thus, an exemplary iterative technique for solving the optimization problem according to one aspect for the joint set of linear precoder design is outlined in Table 1. While gradient descent is utilized, one skilled in the art will appreciate the optimization problem can be solved using other optimization algorithms in other embodiments. In general, the exemplary technique is mainly divided into two distinct parts, namely the initialization and the iteration parts.

TABLE I

Iterative Algorithm for the Joint Linear Precoder Design

Initialization $$d = 2; l = 0;$$
$$\text{for } i = 1 : L$$
$$F_i^{(0)} = \sqrt{\frac{P_i}{M_{T_i}}} I_{M_{T_i}}$$
$$\text{end}$$

TABLE I-continued

Iterative Algorithm for the Joint Linear Precoder Design

Iteration $$l = l + 1;$$
$$\text{for } i = 1 : L$$

$$\delta F_i^{(l)} = \nabla_{F_i^{(l-1)}}^* l(F^{(l-1)}, C, \hat{C});$$

$$\delta F_i^{(l)} = \sqrt{\frac{P_i}{\|\delta F_i^{(l)}\|_F^2}} \delta F_i^{(l)};$$

$$F_i^{(l)} = \frac{1}{d}\delta F_i^{(l)} + \delta F_i^{(l-1)};$$

$$F_i^{(l)} = \sqrt{\frac{P_i}{\|F_i^{(l)}\|_F^2}} F_i^{(l)};$$

end
if
$$l(F^{(l)}, C, \hat{C}) > l(F^{(l-1)}, C, \hat{C})$$
$$d = d + 1; l = l - 1;$$
end Termination For the first part, the iteration index l=0 and the step size is initialized as d=2. In addition, all of the L preceding matrices are initialized as $F_i^{(0)} = \sqrt{P_i/M_{T_i}} I_{M_{T_i}}$, for i=1, L such that the transmit power constraint for each user can be satisfied.

The second part computes the standard gradient and performs projection to satisfy the transmit power constraint. In particular, the normalized gradient $\nabla_{F_i^{(l-1)}} l(F^{(l-1)}, C, \hat{C})$ is computed, the precoding matrix $F_i^{(l-1)}$ is updated to $F_i^{(l)}$, while a projection onto the transmit power constraint for the i-th CPE is done. A subsequent comparison is performed to check if the objective function acquired with the updated precoding matrices is larger than that of the previous one. If so, the step size should be adjusted and all of the L preceding matrices from the previous iteration l-1 should be re-calculated. Finally, the iterative algorithm is terminated when $|l(F^{(l)},C,\hat{C})-l(F^{(l-1)},C,\hat{C})|<\epsilon$, where $\epsilon$ is a small constant.

Figure 3:
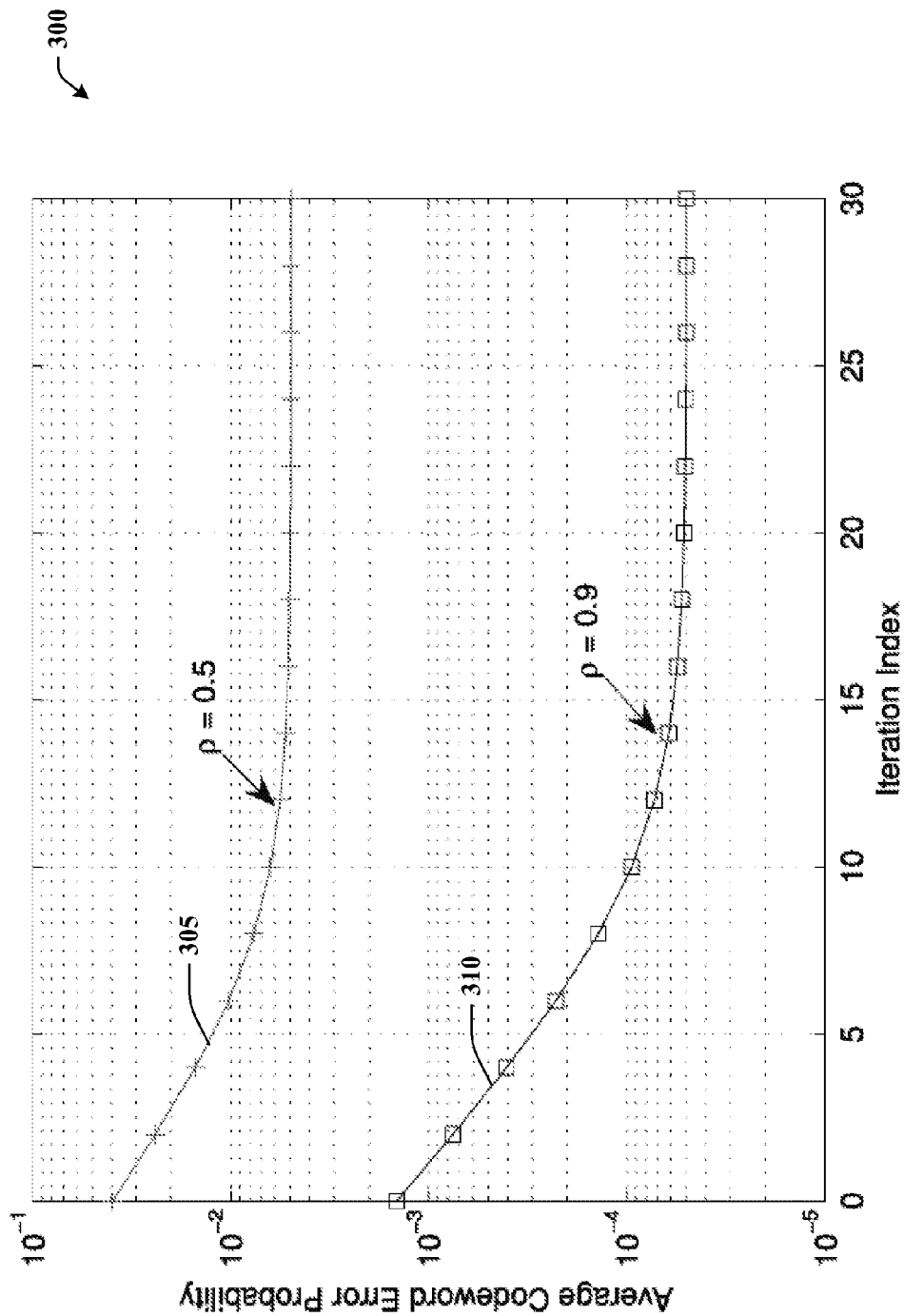
FIG. 3 is a graph of average codeword error probability versus iteration index.

The convergence of the algorithm is guaranteed and proven by means of a descent argument. Suppose the objective function $f$ is bounded below and Lipschitzian with the Lipschitz constant L, and 0<1/d<2/L, where d is the step size. The sequence generated by the projected gradient algorithm then converges. Furthermore, the limit point of this sequence satisfies the first order KKT optimality condition. In other words, the only requirement for the convergence is to choose a suitable value of d such that its value is smaller than the Lipschitz constant. Referring to FIG. 3, FIG. 3 shows the convergence rate for the 2-user MIMO-STBC system when $\rho$=0.5, 0.9, SNR=6 dB, and $M_R$=2. In particular, the curves 305 and 310 for $\rho$=0.5, 0.9, respectfully, illustrate that the technique converges after running about 20 iterations.

Although the joint set of linear precoders can be solved numerically through the iterative algorithm, there is a special case in which a closed-form precoding structure exists, which allows the behavior of linear precoders to be investigated when the channel quality is at two extremes (very poor and very good) and derive a closed-form expression on the Chernoff bound of the conditional PEP at high SNR.

One attractive property of the average distance design embodiment is that when OSTBC is applied, the codeword distance product metric can be significantly simplified as a scaled identity matrix, namely $A_{ave,OSTBC}(\alpha)=\alpha I_{M_TL}$, where $\alpha$ is the average distance determined by both the constellation of the system and the code itself. Thus, by considering a precoder design with OSTBC subject to the average distance design criterion, the dependence of the conditional upper-bounded PEP on the codeword pairs is now solely through the codeword-dependent parameter $\alpha$. Interestingly, if the conditional covariance matrix is also a scaled identity matrix, the centralized precoder design can be decoupled in an embodiment into a distributed design in which each of the L linear preceding matrices is derived at the respective CPE.

If each entry of H and $\hat{H}$ is a complex Gaussian random variable with the same variance, say $\sigma_h^2$, the covariance matrix of H conditioned on $\hat{H}$ is given by $$\Sigma_{H|\hat{H}} = \sigma_h^2(1-\rho^2)I_{M_TL} \qquad \text{(Equation 19)}$$

where $\rho = E\{H(i,j)\hat{H}(i,j)\}/\sigma_h^2$ is the normalized correlation coefficient between the (i,j)-th entries of H and $\hat{H}$, which are denoted by H(i,j) and $\hat{H}$(i,j), respectively.

Based on the block diagonal structures of $A_{ave,OSTBC}(\alpha)$ and $\Sigma_{H|\hat{H}}$, the metric $W(F,C,\hat{C})$ given in Equation 11 is greatly simplified as (Equation 20)
$$W_{ave,OSTBC}(F, \alpha) = \sigma_h^2(1-\rho^2)\left(\frac{\alpha}{4\sigma_h^2}\sigma_h^2(1-\rho^2)FF^* + I_{M_TL}\right)$$

(Equation 21)
$$\triangleq \begin{bmatrix} W_1(F_1, \alpha) & \cdots & 0 \\ \vdots & \ddots & \vdots \\ 0 & \cdots & W_L(F_L, \alpha) \end{bmatrix}$$

where $$W_i(F_i, \alpha) \triangleq \sigma_h^2(1-\rho^2)\left(\frac{\alpha}{4\sigma_h^2}\sigma_h^2(1-\rho^2)F_iF_i^* + I_{M_{T_i}}\right).$$

By substituting Equation 20 into Equation 12, the objective function $l(F,C,\hat{C})$ is decomposed into L terms as $$l_{ave,OSTBC}(F, \alpha) = \qquad \text{(Equation 22)}$$

$$\sum_{i=1}^{L} \{tr\{M_{H_i|\hat{H}_i} W_i(F_i, \alpha)^{-1} M_{H_i|\hat{H}_i}^*\} - M_R \log\det(W_i(F_i, \alpha))\}$$

$$\triangleq \sum_{i=1}^{L} l_i(F_i, \alpha). \qquad \text{(Equation 23)}$$

Thus, the multiuser linear precoder design can be decoupled into L single-user precoder designs with the optimization problem is posed as follows.

Optimization Problem 3. For every realization of $M_{H_1|\hat{H}_1}$ and $\Sigma H_{H_1|\hat{H}_1}$, a linear precoder $F_i$ is chosen such that the PEP-related objective function $l_i(F,\alpha)$ is minimized subject to a transmit power constraint as expressed in Equation 25 as follows.

$$\min_{F_i}: tr\{M_{H_i|\hat{H}_i} W_i(F_i, \alpha)^{-1} M_{H_i|\hat{H}_i}^*\} - M_R\log\det(W_i(F_i, \alpha)) \quad \text{(Equation 24)}$$

$$\text{subject to: } tr\{F_iF_i^*\} = P_i \qquad \text{(Equation 25)}$$

with $W_i(F_i,\alpha)$ being defined in Equation 21.

By using the KKT optimality conditions, $F_i$ can be analytically solved. In particular, when average precoding gain is used to determine the linear precoder and orthogonal space-time block code (OSTBC) is applied, the linear precoder of the i-th CPE has the closed-form structure.

$$F_i = U_{M_{H_i|\hat{H}_i}} \Lambda_{F_i} \quad \text{(Equation 26)}$$

where $$(\Lambda_{F_i}(k,k))^2 = \left( \frac{\frac{2\sigma_n^2}{\mu_i}\left(M_R + \sqrt{M_R^2 + 4\mu_i \Lambda_{M_{H_i|\hat{H}_i}}(k,k)}\right) - 4\sigma_n^2 \sigma_h^2(1-\rho^2)}{\alpha \sigma_h^4 (1-\rho^2)^2} \right)^+$$

with $(\cdot)^+ = \max(0,x)$, $\mu_i \geq 0$ being the Lagrangian multiplier associated with the transmit power constraint for the i-th CPE and $M^*_{H_1|\hat{H}_1} M_{H_1|\hat{H}_1} = U_{M_{H_1|\hat{H}_1}} \Lambda_{M_{H_1|\hat{H}_1}} U^*_{M_{H_1|\hat{H}_1}}$ via eigenvalue decomposition.

In the closed-form preceding structure in Equation 26, the optimal left singular vector is the eigenvector of $M^*_{H_i|\hat{H}_i} M_{H_i|\hat{H}_i}$, which implies that the beam directions of the i-th linear precoder depend on channel knowledge obtained from the actual realization of the channel estimate.

The behavior of linear precoders is investigated when the quality of the outdated CSI is at two extremes. In addition, asymptotic closed-form expression on the Chernoff bound of the conditional PEP is also derived.

With good channel quality, or equivalently $\rho \to 1$, the conditional covariance approaches zero, i.e., $\Sigma_{HH|\hat{H}} \to 0$. Using the fact that the matrix inverse $(I-Q)^{-1} = \Sigma_{q=0}^{\infty} Q^q$ exists when the matrix norm of Q is smaller than one, when $\rho \to 1$, $$W_{ave,OSTBC}(F,\alpha)^{-1} = \quad \text{(Equation 27)}$$

$$\frac{1}{\sigma_h^2(1-\rho^2)} \sum_{k=0}^{\infty} \left(-\frac{\alpha}{4\sigma_n^2} \sigma_h^2(1-\rho^2) FF^*\right)^k.$$

By neglecting the higher order terms of Equation 27 and after a series of manipulation, the conditional upper-bounded PEP in Equation 10 can be simplified as $$Pr(C \to \overline{C}|\hat{H}) < \exp\left[-\frac{\alpha}{4\sigma_n^2} tr\left\{\sum_{i=1}^{L} M_{H_i|\hat{H}_i} F_i F_i^* M^*_{H_i|\hat{H}_i}\right\}\right]. \quad \text{(Equation 28)}$$

Since minimizing Equation 28 is equivalent to maximizing $tr\{M_{H_i|\hat{H}_i} F_i F^*_i M^*_{H_i|\hat{H}_i}\}$, the optimization problem for linear precoder design can be rewritten as follows:

Optimization Problem 4. If the outdated CSI is assumed to be of excellent quality, for every realization of $M_{H_i|\hat{H}_i}$ and $\Sigma_{H_i H_i|\hat{H}_i}$, a linear precoder $F_i$ is formulated such that the objective function in Equation 29 is maximized subject to the transmit power constraint as expressed in Equation 30 as follows.

$$\max_{F_i}: tr\{M_{H_i|\hat{H}_i} F_i F^*_i M^*_{H_i|\hat{H}_i}\} \quad \text{(Equation 29)}$$

$$\text{subject to: } tr\{F_i F^*_i\} = P_i. \quad \text{(Equation 30)}$$

Similar to the previous optimization problem, the solution is obtained by using the KKT optimality conditions and the closed-form precoding structure is given by $$F_i = U_{M_{H_i|\hat{H}_i}} \hat{\Lambda}_{F_i} \quad \text{(Equation 31)}$$

where $\hat{\Lambda}_{F_i} = \text{diag}\{\sqrt{P_i}, 0, \ldots, 0\}$. By comparing the resulting preceding structures of Optimization Problems 3 and 4, the power allocation strategy changes significantly to allocate all transmit power on the strongest eigenmode. Thus, as the quality of the outdated CSI increases, the linear precoder of the i-th CPE drops eigenmodes until it becomes a single-eigenmode beamformer, which agrees with the asymptotic result for single-user scenario where perfect CSI is available at the transmitter.

By substituting Equation 31 into Equation 27, a simplified Chernoff bound in Equation 10 is determined:

(Equation 32)

$$Pr(C \to \overline{C}|\hat{H}) \leq \prod_{i=1}^{L} \frac{\det(\sigma_h^2(1-\rho^2) I_{M_{T_i}})^{M_R}}{\det(\sigma_h^2(1-\rho^2)(\frac{\alpha}{4\sigma_n^2} \sigma_h^2(1-\rho^2) \overline{\Lambda}_{F_i} + I_{M_{T_i}}))^{M_R}} \times$$

$$\exp\left[tr\left\{\frac{1}{\sigma_h^2(1-\rho^2)} \Lambda_{M_{H_i|\hat{H}_i}}\left(\left(\frac{\alpha}{4\sigma_n^2} \sigma_h^2(1-\rho^2)\overline{\Lambda}_{F_i} + I_{M_{T_i}}\right)^{-1} - I_{M_{T_i}}\right)\right\}\right] =$$

$$\prod_{i=1}^{L} \left(\frac{\alpha P_i}{4\sigma_n^2} \sigma_h^2(1-\rho^2) + 1\right)^{-M_R}$$

$$\exp\left[\frac{\Lambda_{M_{H_i|\hat{H}_i}}(1,1)}{\sigma_h^2(1-\rho^2)}\left(\left(\frac{\alpha P_i}{4\sigma_n^2}\sigma_h^2(1-\rho^2)+1\right)^{-1} - 1\right)\right].$$

Therefore, the conditional PEP decreases exponentially with the correlation coefficient $\rho$. In addition, the PEP improves with the codeword-dependent parameter $\alpha$ and the transmit power $P_i$ at a polynomial rate of $M_R$ while PEP degrades with the number of CPEs L.

When $\rho \to 0$ and $\Sigma_{HH|\hat{H}} \to \sigma_h^2 I_{M_T L}$, the optimal linear precoder is a scaled identity matrix $$F_i = \sqrt{\frac{P_i}{M_{T_i}}} I_{M_{T_i}} \quad \text{(Equation 33)}$$

which indicates that when the quality of the outdated CSI deteriorates, the precoder tends to have beamforming on all eigenmodes with equal power allocation. This solution also agrees with the asymptotic result for a single-user scenario where no CSI is available at the transmitter. By substituting Equation 33 into Equation 10, the conditional upper-bounded PEP is simplified as:

(Equation 34)

$$Pr(C \to \overline{C}|\hat{H}) \leq \prod_{i=1}^{L}\left(\frac{\alpha P_i}{4M_{T_i}\sigma_n^2}\sigma_h^2(1-\rho^2)+1\right)^{-M_R M_{T_i}} \times$$

$$\exp\left[\frac{tr\{M_{H_i|\hat{H}_i} M^*_{H_i|\hat{H}_i}\}}{\sigma_h^2(1-\rho^2)}\left(\left(\frac{\alpha P_i}{4M_{T_i}\sigma_n^2}\sigma_h^2(1-\rho^2)+1\right)^{-1} - 1\right)\right].$$

Similar to Equation 32, the conditional PEP derived above decreases exponentially with $\rho$. In addition, it is not only a function of the codeword-dependent parameter, the numbers of receive antennas, and the number of CPEs, but also a function of transmit antennas. Although Equations 32 and 34 are derived using a high-SNR assumption, these Chernoff bounds can still be successfully utilized in situations where the SNR is not high.

The average codeword error probability of the multiuser MIMO-STBC system is investigated according to an aspect of the linear precoder technique. For all of the simulations, unless otherwise indicated, $\sigma_h^2=1$ is assumed and the inputs to the space-time encoders are assumed to form an independently and identically distributed sequence of equally-probable symbols.

The performance of the centralized and distributed precoder designs are compared for a multiuser MIMO system with Alamouti's STBC. All elements of the codewords are taken from a Binary Phase-Shift Keying (BPSK) constellation, in which $\alpha=2.13$, unless otherwise indicated.

Figure 4:
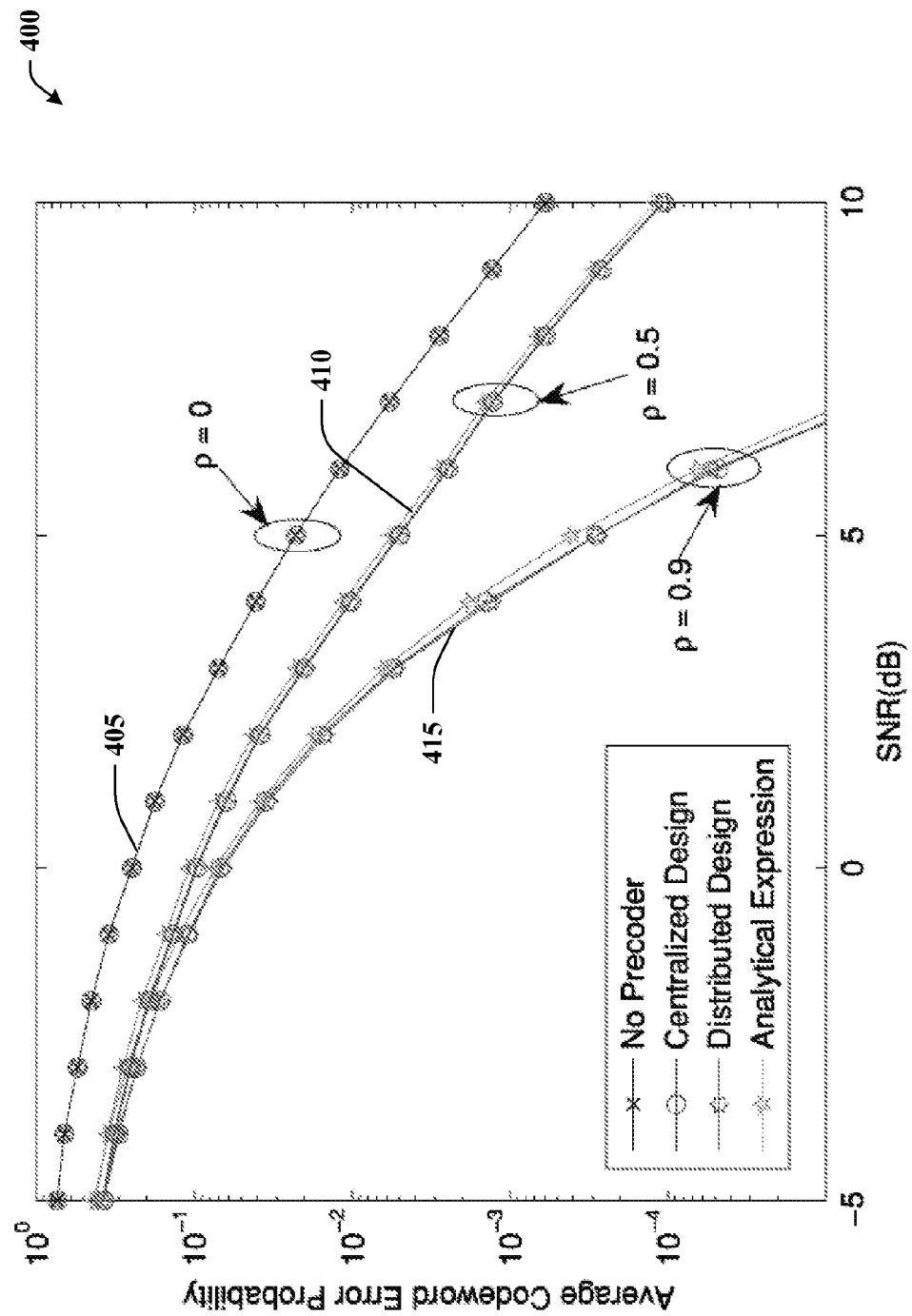
FIG. 4 is a graph of average codeword error probability versus signal to noise ratio (SNR) for various precoder designs.

The performance of both aspects with different channel qualities, namely $\rho=0, 0.5, 0.9$ are demonstrated. Referring to FIG. 4, the performances of both average distance design and minimum distance design embodiments are exactly the same, which reveals the benefit of using the average distance design criterion for OSTBC. In particular, the linear precoder can now be designed at the respective CPE.

More importantly, when no outdated CSI is available, i.e., $\rho=0$, the performances of both designs reduce to that of the conventional beamforming system, which can be justified by the asymptotic analysis that when $\rho \to 0$, the precoder tends to perform beamforming on all eigenmodes with equal power allocation which results in no precoding gain. On the other hand, when the outdated CSI is of better quality, the codeword error probability of both designs outperforms that of the system with no precoder by 2-5 dB.

Figure 5:
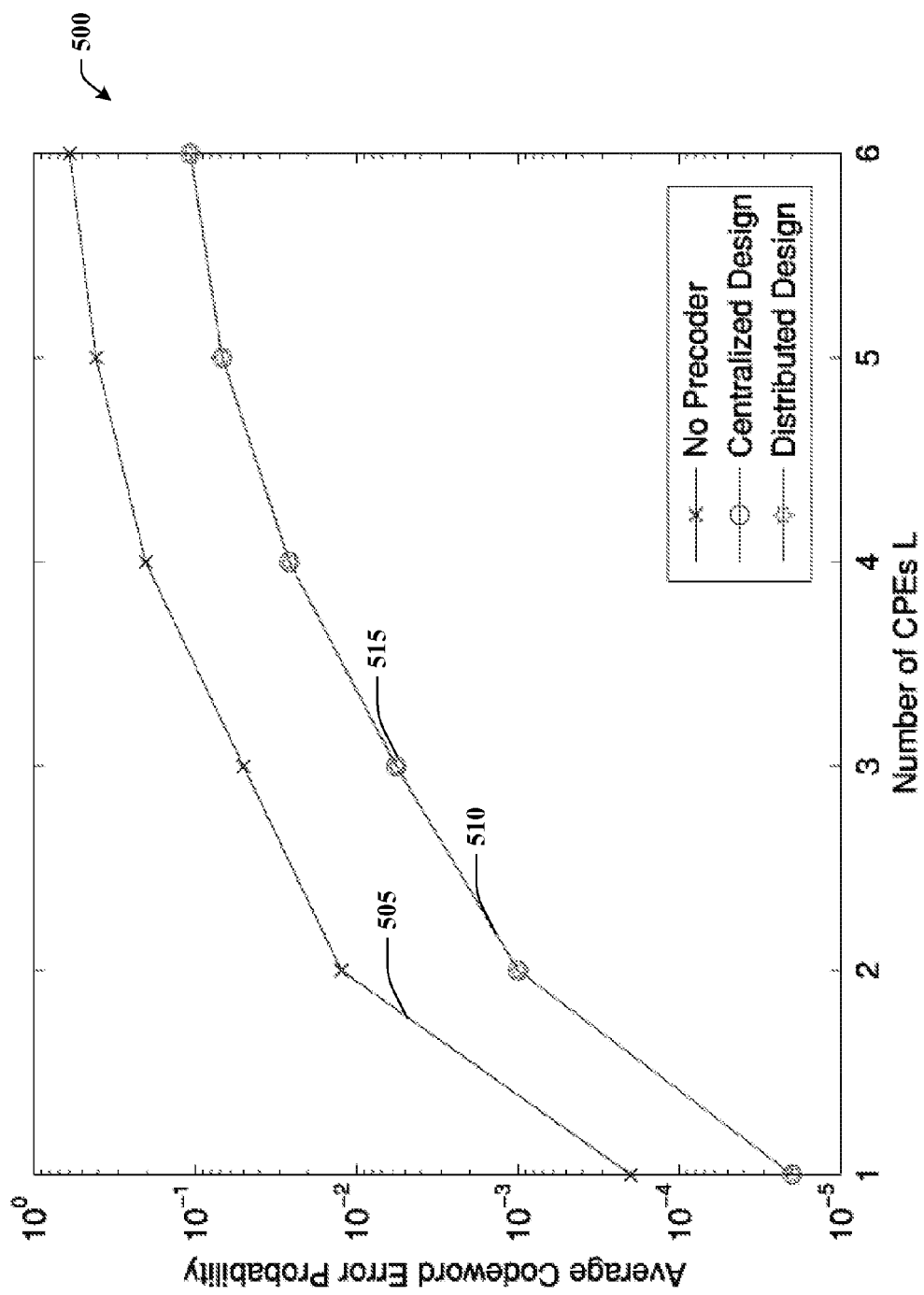
FIG. 5 is a graph of average codeword error probability versus the number of consumer premise equipments communicating with the base station for various precoder designs.
Figure 6:
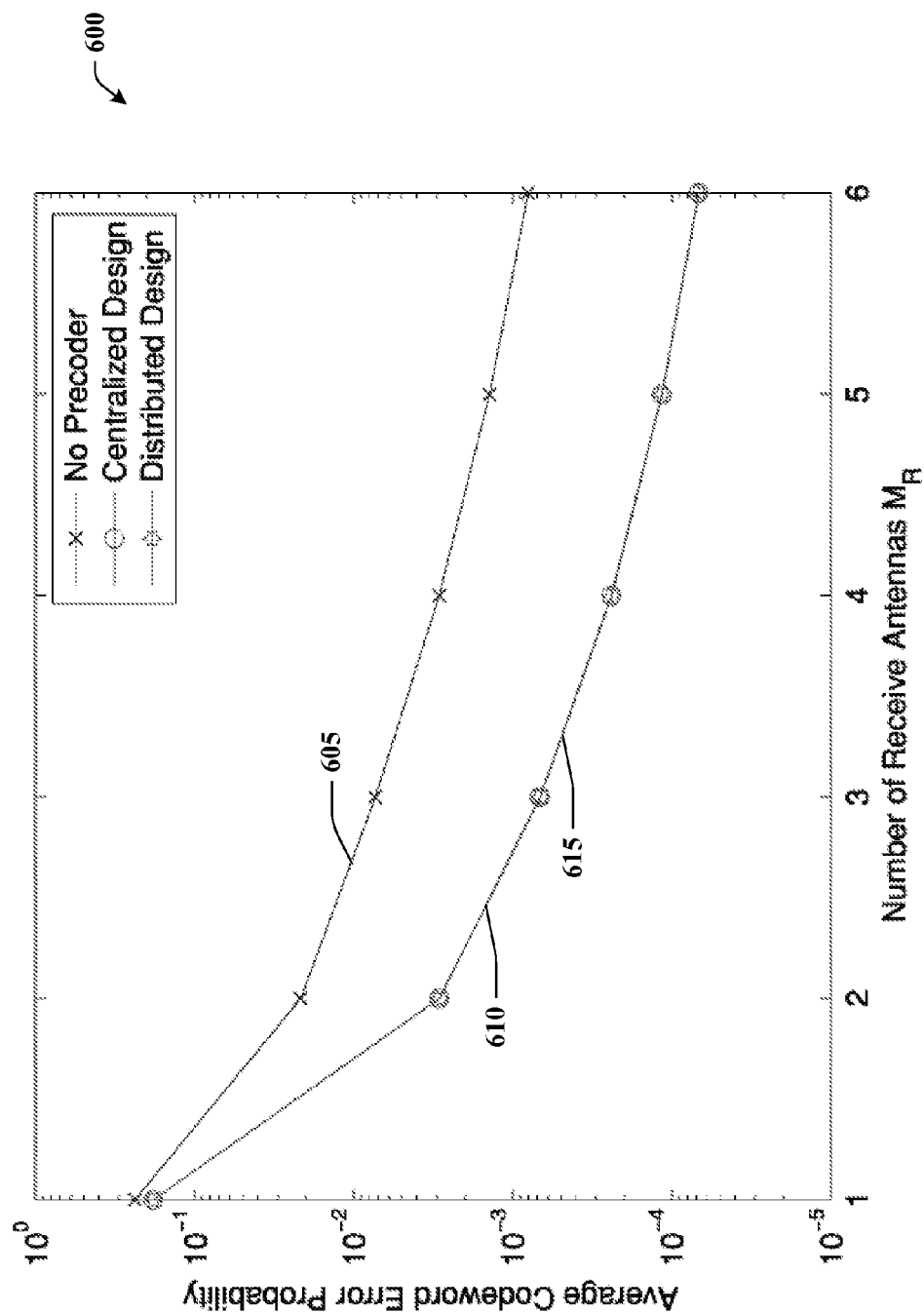
FIG. 6 is a graph of average codeword error probability for various precoder designs versus the number of receive antennas at a base station.

Referring to FIGS. 5 and 6, the effects of the number of CPEs L and the number of receive antennas $M_R$ respectfully are illustrated. In FIG. 5, the system performance is at SNR=10 dB and $\rho=0.9$. Curves 505, 510, and 515 for no precoder, the centralized embodiment, and the disturbed embodiment are shown, respectively. Both precoder designs outperform the conventional system with no channel precoding by about one order of magnitude in terms of average codeword error probability. The effect of $M_R$ is depicted in FIG. 6 at SNR=5 dB and $\rho=0.9$. Curves 605, 610, and 615 for no precoder, the centralized embodiment, and the disturbed embodiment are shown, respectively. In particular, as shown in FIG. 6, the system performance improves with the number of receive antennas due to the diversity gain. In addition, both precoder embodiments also outperform the conventional system by about one order of magnitude.

Figure 7:
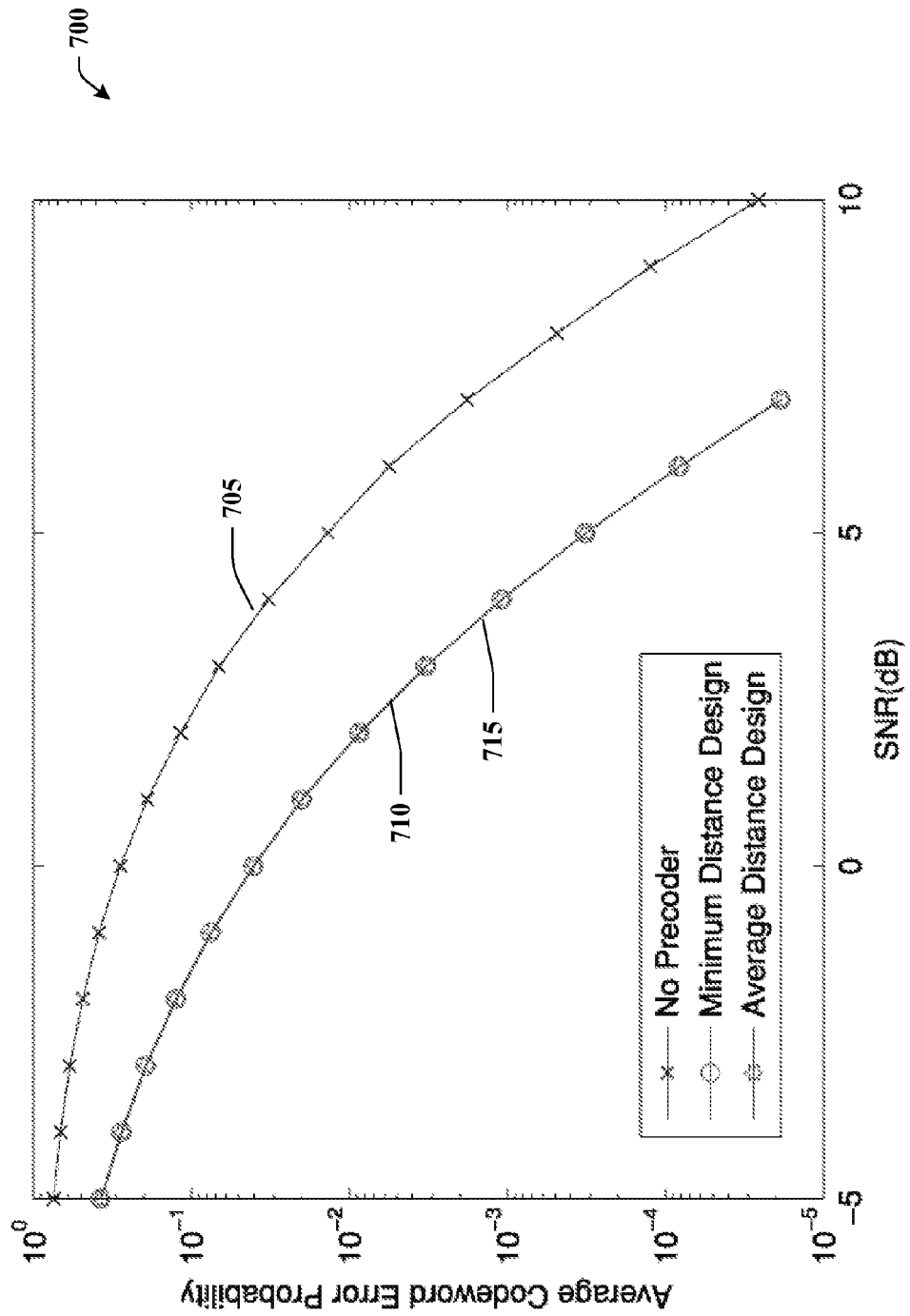
FIG. 7 is a graph of average codeword error probability versus SNR for various precoder designs using binary phase-shift keying.
Figure 8:
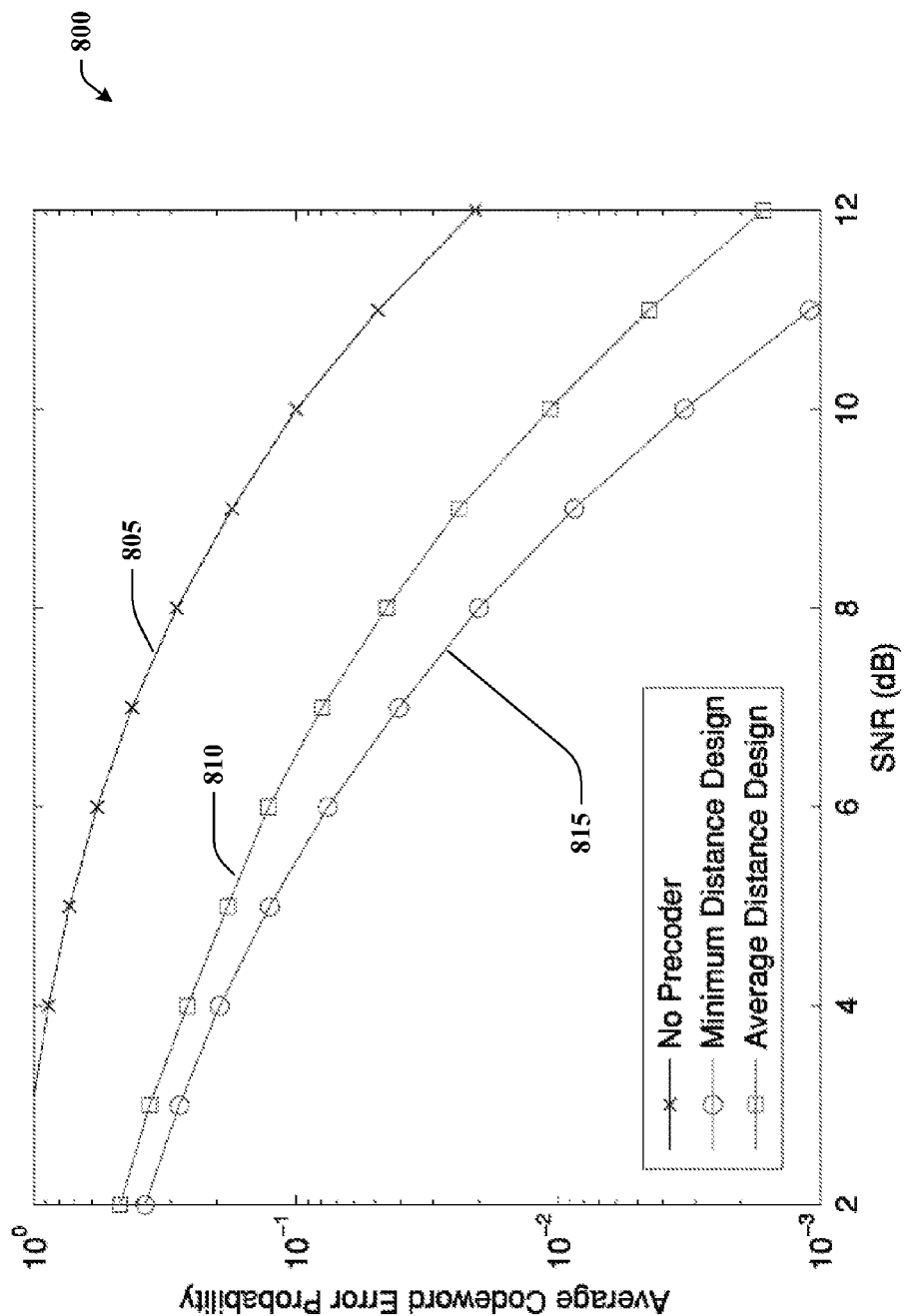
FIG. 8 is a graph of average codeword error probability versus SNR for various precoder designs using 16QAM.

Non-orthogonal STBC, namely quasi-orthogonal space-time block code (QSTBC), is considered and compared to the performance of the centralized design with minimum and average codeword distance design criteria. FIGS. 7 and 8 illustrate the average codeword error probability for the system with BPSK and 16QAM modulations, respectively, at $\rho=0.9$. Curves 705/805, 710/810, and 715/815 represent a conventional system with no precoder, an average distance embodiment, and a minimum distance embodiment, respectively in FIGS. 7 and 8. When the constellation level is small, the performance of the centralized design with average distance design criterion is exactly the same as that with minimum distance one. However, the preceding gain of the average distance design decreases with the constellation level since the number of minimum-distance codeword pairs becomes larger and more dominant in affecting the system performance.

Figure 9:
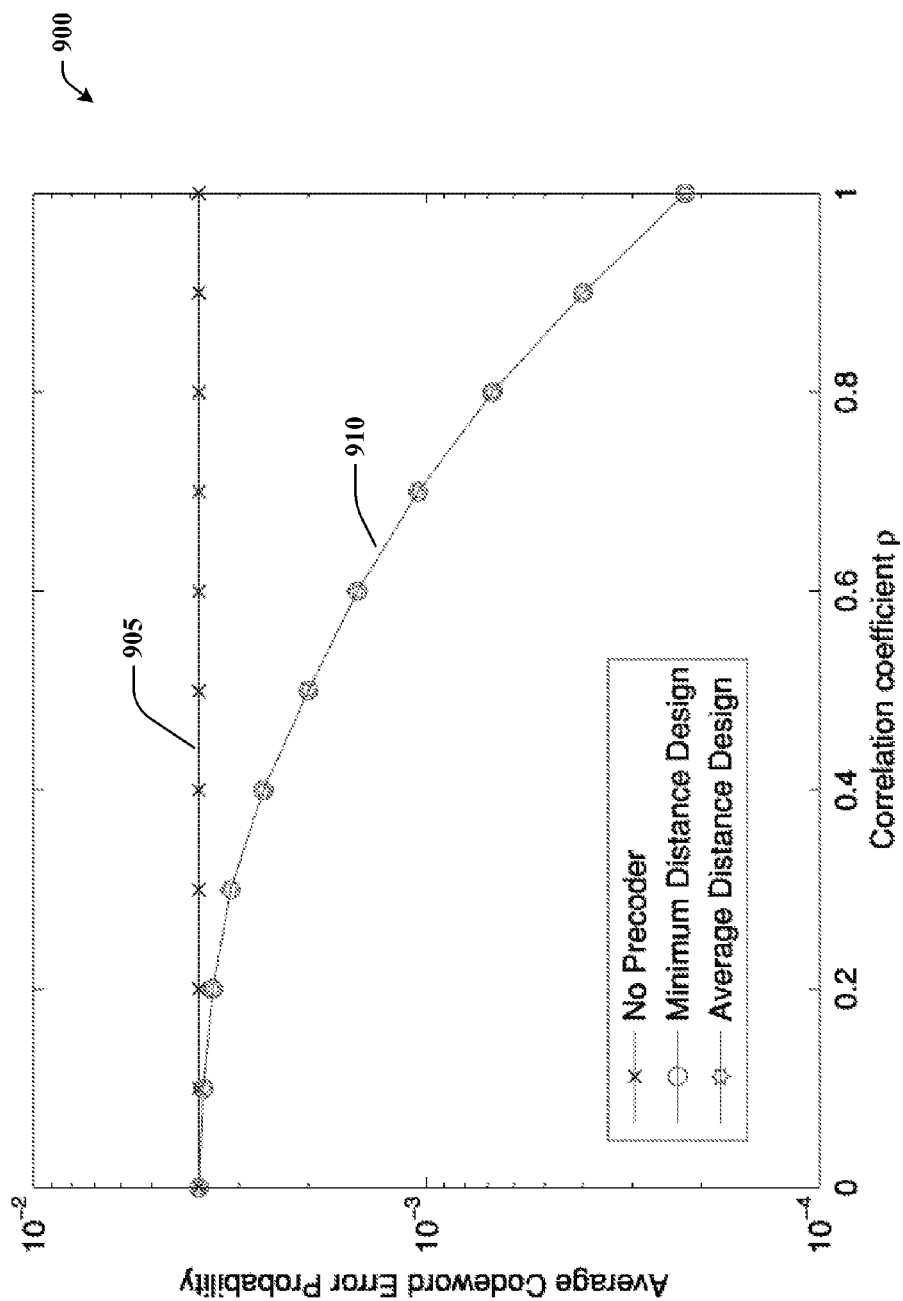
FIG. 9 is a graph of average codeword error probability versus correlation coefficient for various precoder designs.

As the final example, the effect of channel quality is shown in FIG. 9. Curve 905 illustrates the conventional system without a precoder and curve 910 illustrates the performance of both precoder embodiments. The SNR is set at 5 dB and the modulation is BPSK. Thus, when the channel quality is poor ($\rho \to 0$), the performance is the same as that of the conventional beamforming. On the other hand, significant preceding gains are achieved as $\rho \to 1$.

Figure 10:
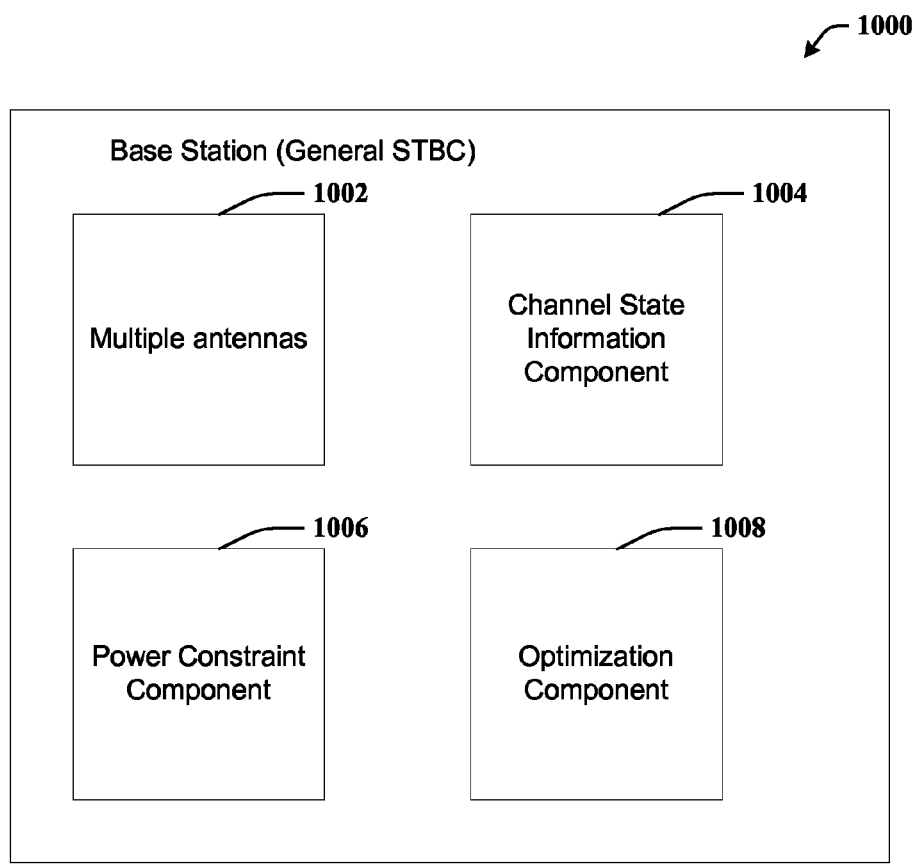
FIG. 10 is a block diagram of a base station in accordance with an aspect of the present invention.
Figure 11:
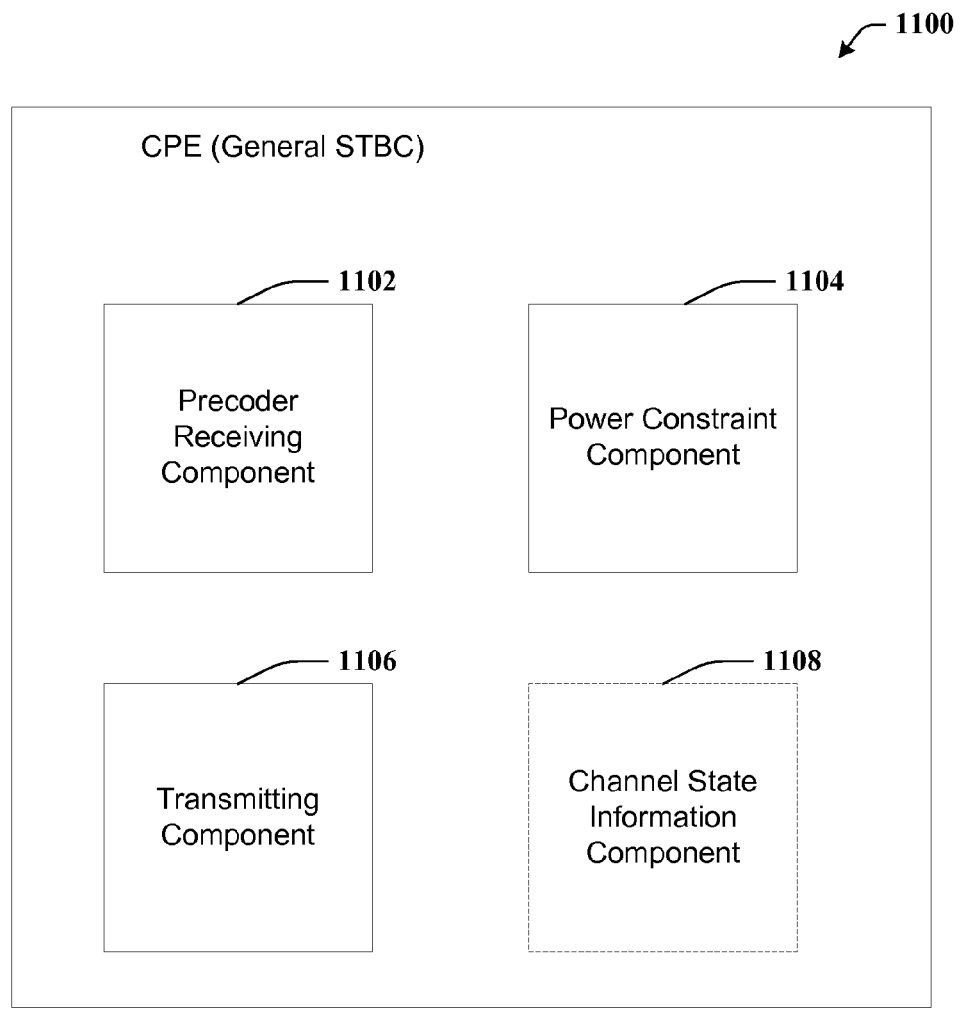
FIG. 11 is a block diagram of a consumer premise equipment in accordance with an aspect.
Figure 12:
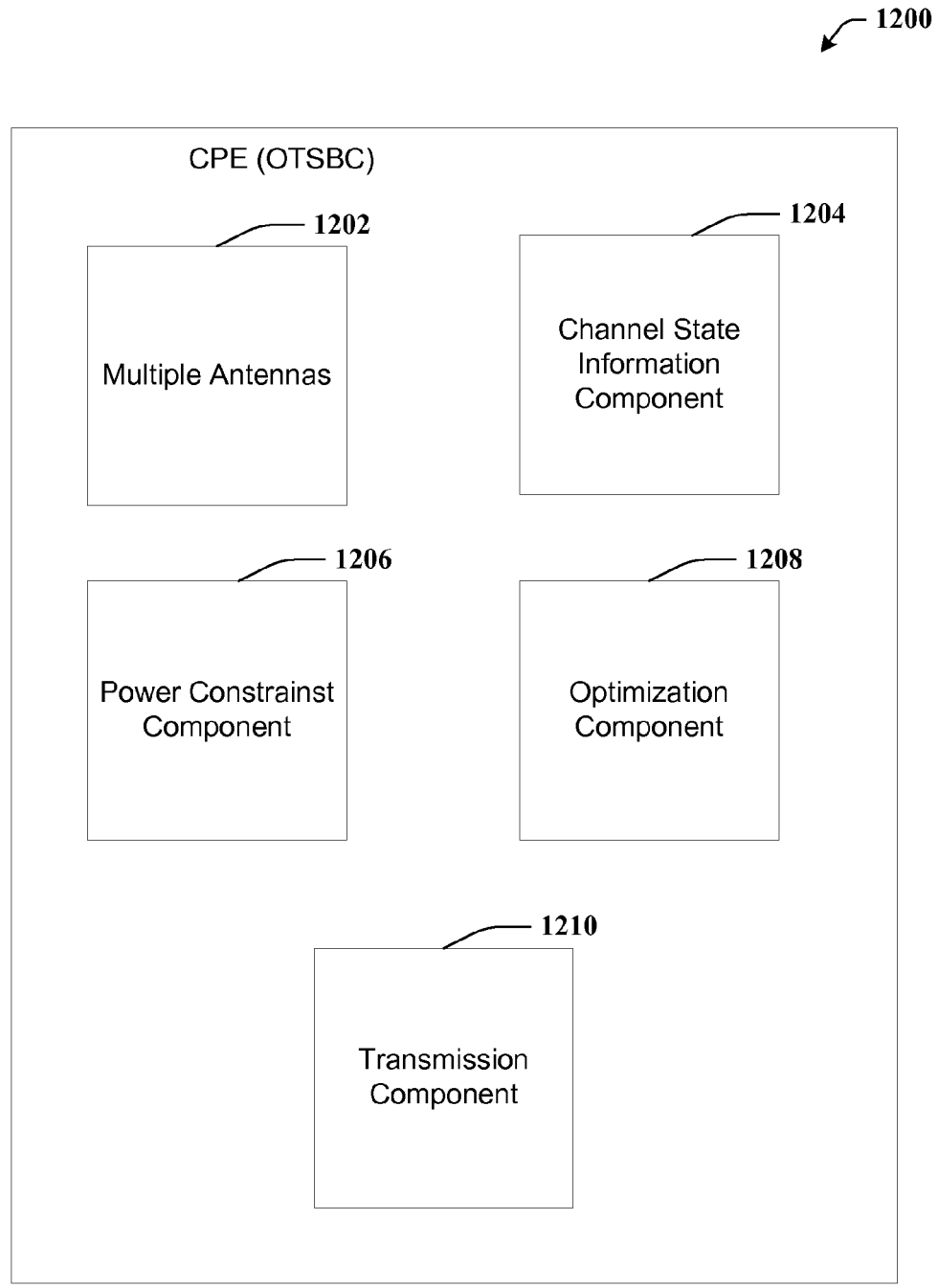
FIG. 12 is a block diagram of a consumer premise equipment in accordance with another aspect.

FIGS. 10-12 illustrate components and/or hardware of a base station and a CPE according to aspects of the disclosed techniques. For the sake of clarity, well-known hardware structure (e.g., multiplexers, decoders) used in base stations and/or consumer premise equipments as well as other components providing other functionality are not shown and described. However, one skilled in the art will appreciate that these additional hardware and component can be present.

Referring to FIG. 10, FIG. 10 illustrates an exemplary base station according to one embodiment. The base station comprises multiple antennas 1002, which can include multiple receive and transmit antennas for uplink and downlink, respectively. The channel state information component 1004 receives an indication of outdated channel state information. This indication can be from a local component (not shown) estimating that locally or from one or more CPEs. The power constraint component 1006 receives an indication of the transmit power constraints from at least one CPE. The optimization component 1008 solves the optimization problem subject to the indicated power constraints and based on the outdated channel state information. For example, the optimization can use the iterative technique described supra. The transmission component 1010 transmits the determined linear precoders to each of the CPEs.

FIG. 11 illustrates an exemplary CPE in accordance with a centralized embodiment. A precoder receiving component 1102 receives a linear precoder to use from the base station and the transmitting component 1106 transmits data in accordance with the indicated linear precoder. Power constraint component 1104 indicates the transmit power constraint to the base station. Similarly, channel state information component 1108 can detect the current channel state information and relay the CSI to the base station.

FIG. 12 illustrates an exemplary CPE in accordance with OSTBC. The components/hardware are similar to those described with respect to FIG. 10 on the base station, except optimization component 1208 solves the simplified closed form optimization problem. In addition, instead of indicating the linear precoder to the CPEs, transmission component 1210 transmits data in accordance with the linear precoder determined as the solution to the optimization problem.

Figure 13:
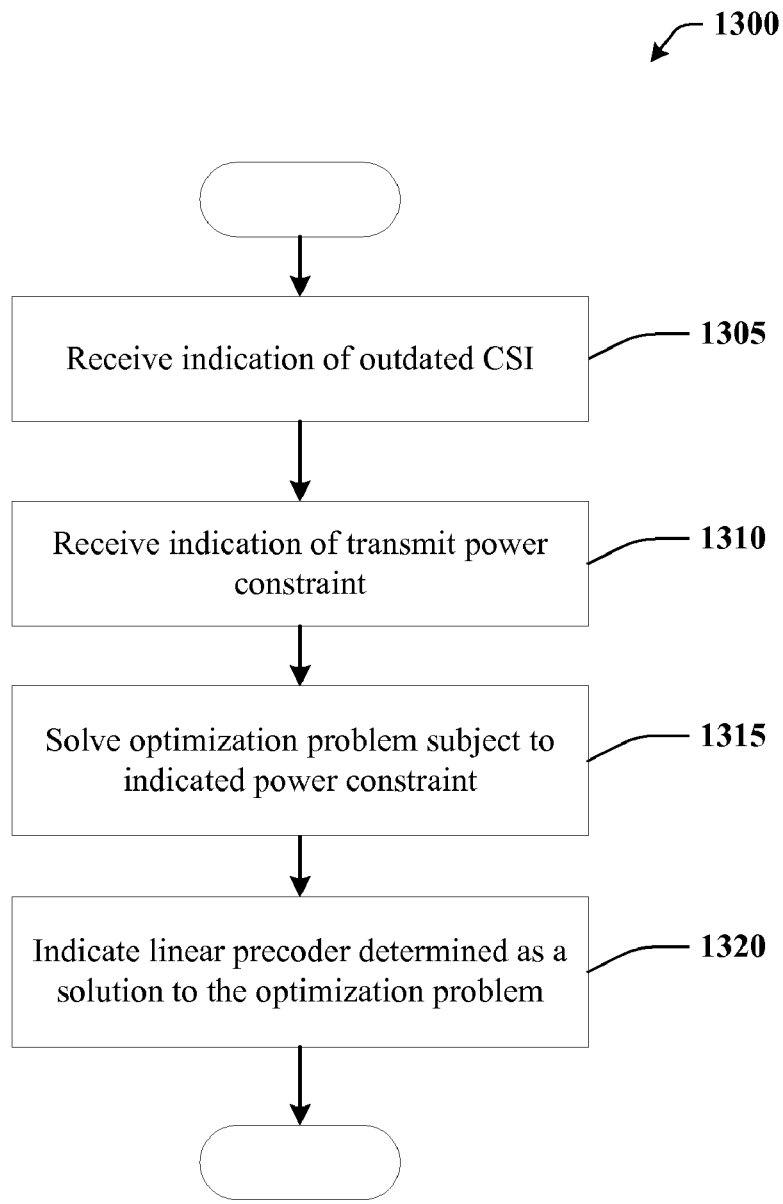
FIG. 13 is a flowchart of a method of a base station in accordance with an aspect of the present invention.
Figure 14:
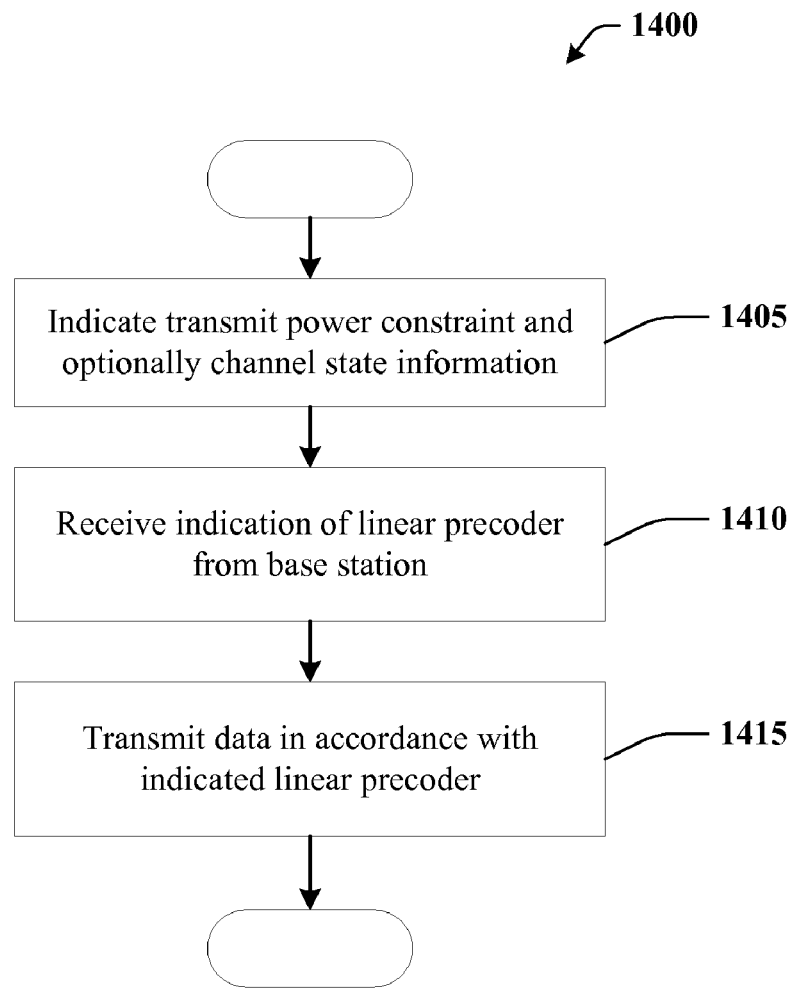
FIG. 14 is a flowchart of a method of a consumer premise equipment (CPE) in accordance with an aspect of the present invention.
Figure 15:
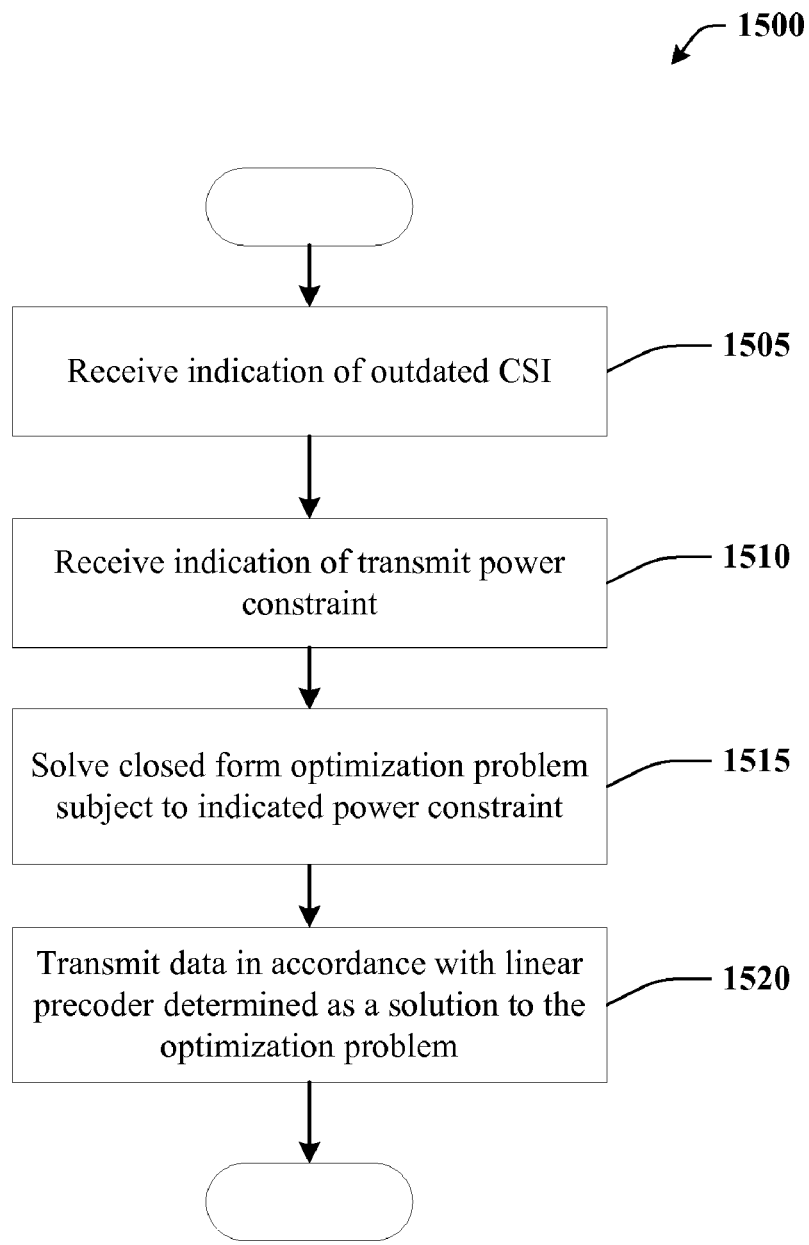
FIG. 15 is a flowchart of a method of a consumer premise equipment in accordance with another aspect of the present invention.

Turning briefly to FIGS. 13-15, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention. Furthermore, although for the sake of clarity, the methods are shown for a single determination of the linear precoder, one will appreciate that these methods can be preformed continuously.

FIG. 13 illustrates an exemplary method at a base station according to one embodiment. At 1305, an indication of outdated CSI is received. The indication can come from a component of the base station that estimates the CSI or can be received from one or more devices (e.g., CPEs) in the wireless network. At 1310, an indication of the transmit power constraints for each of the CPEs is received. For example, the CPEs can transmit this information or this information can be retrieved from a local cache of the transmit power constraints. At 1315, the optimization problem is solved subject to the indicated power constraints. As stated above, the solution can, for example, be performed using the iterative technique described above. However, one will appreciate that other techniques for solving optimization problems can also be utilized in other embodiments. At 1320, one or more linear precoders are determined from the solution to the optimization problem. For example, a linear precoder can be indicated to each of the CPEs on the wireless network.

Referring to FIG. 14, an exemplary method of a CPE according to a centralized design embodiment is illustrated. At 1405, the transmit power constraint and optionally channel state information is indicated to the base station. At 1410, an indication is received from the base station of a linear precoder. At 1415, data can be transmitted in accordance with the indicated linear precoder.

Referring to FIG. 15, an exemplary method of the distributed technique for OSTBC at a CPE is illustrated. At 1505, an indication of outdated CSI is received. The indication can come from a component of the CPE that estimates the CSI or can be received from one or more devices (e.g., other CPEs or the BS) in the wireless network. At 1510, an indication of the transmit power constraints for the CPE is received. At 1515, the closed form optimization problem is solved subject to the indicated power constraint. At 1520, data is transmitted using the linear precoders determined as a solution to the optimization problem.

Figure 16:
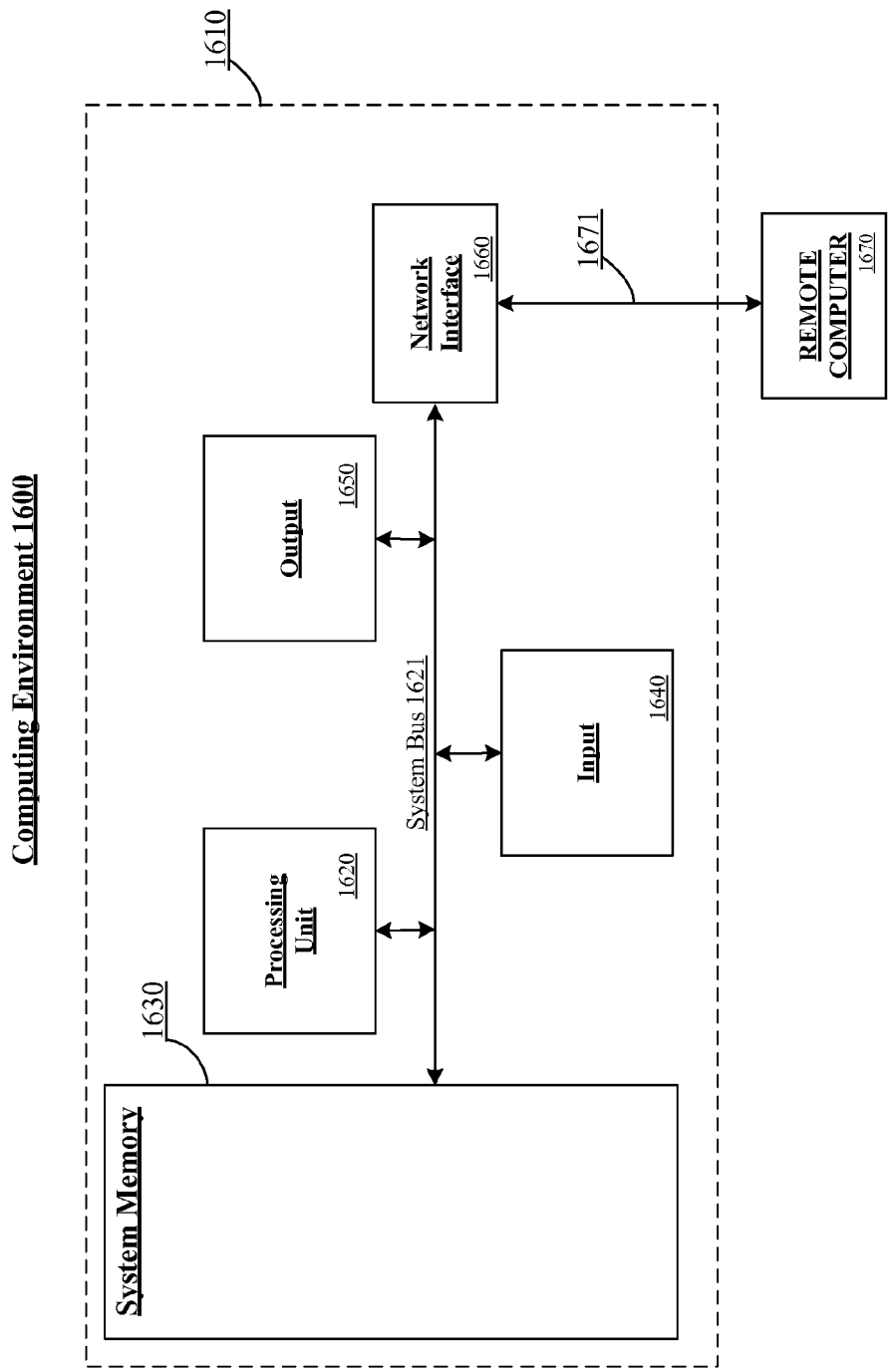
FIG. 16 is a block diagram representing an exemplary non-limiting computing system or operating environment in which the present invention may be implemented.

Turning to FIG. 16, an exemplary non-limiting computing system or operating environment in which the present invention may be implemented is illustrated. One of ordinary skill in the art can appreciate that handheld, portable and other computing devices and computing objects of all kinds are contemplated for use in connection with the present invention, i.e., anywhere that a communications system may be desirably configured. Accordingly, the below general purpose remote computer described below in FIG. 16 is but one example of a computing system in which the present invention may be implemented.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 16 thus illustrates an example of a suitable computing system environment 1600 in which the invention may be implemented but the computing system environment 1600 is only one example of a suitable computing environment and is not intended to suggest any limitation as to the scope of use or functionality of the invention. Neither should the computing environment 1600 be interpreted as having any dependency or requirement relating to any one or combination of components illustrated in the exemplary operating environment 1600.

With reference to FIG. 16, an example of a computing device for implementing the invention includes a general purpose computing device in the form of a computer 1610. Components of computer 1610 may include, but are not limited to, a processing unit 1620, a system memory 1630, and a system bus 1621 that couples various system components including the system memory to the processing unit 1620. The system bus 1621 may be any of several types of bus structures including a memory bus or memory controller, a peripheral bus, and a local bus using any of a variety of bus architectures.

Computer 1610 typically includes a variety of computer readable media. Computer readable media can be any available media that can be accessed by computer 1610. By way of example, and not limitation, computer readable media may comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1610. Communication media typically embodies computer readable instructions, data structures, program modules or other data in a modulated data signal such as a carrier wave or other transport mechanism and includes any information delivery media.

The system memory 1630 may include computer storage media in the form of volatile and/or nonvolatile memory such as read only memory (ROM) and/or random access memory (RAM). A basic input/output system (BIOS), containing the basic routines that help to transfer information between elements within computer 1610, such as during start-up, may be stored in memory 1630. Memory 1630 typically also contains data and/or program modules that are immediately accessible to and/or presently being operated on by processing unit 1620. By way of example, and not limitation, memory 1630 may also include an operating system, application programs, other program modules, and program data.

The computer 1610 may also include other removable/non-removable, volatile/nonvolatile computer storage media. For example, computer 1610 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1621 through a non-removable memory interface such as an interface, and a magnetic disk drive or optical disk drive is typically connected to the system bus 1621 by a removable memory interface, such as an interface.

A user may enter commands and information into the computer 1610 through input devices. Input devices are often connected to the processing unit 1620 through user input 1640 and associated interface(s) that are coupled to the system bus 1621, but may be connected by other interface and bus structures, such as a parallel port, game port or a universal serial bus (USB). A graphics subsystem may also be connected to the system bus 1621. A monitor or other type of display device is also connected to the system bus 1621 via an interface, such as output interface 1650, which may in turn communicate with video memory. In addition to a monitor, computers may also include other peripheral output devices, which may be connected through output interface 1650.

The computer 1610 operates in a networked or distributed environment using logical connections to one or more other remote computers, such as remote computer 1670, which may in turn have capabilities different from device 1610. The logical connections depicted in FIG. 16 include a network 1671. The network 1671 can include both the wireless network described herein as well as other networks, such a local area network (LAN) or wide area network (WAN).

When used in a LAN networking environment, the computer 1610 is connected to the LAN through a network interface or adapter. When used in a WAN networking environment, the computer 1610 typically includes a communications component, such as a modem, or other means for establishing communications over the WAN, such as the Internet. A communications component, such as a modem, which may be internal or external, may be connected to the system bus 1621 via the user input interface of input 1640, or other appropriate mechanism. In a networked environment, program modules depicted relative to the computer 1610, or portions thereof, may be stored in a remote memory storage device. It will be appreciated that the network connections shown and described are exemplary and other means of establishing a communications link between the computers may be used.

The present invention has been described herein by way of examples. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Various implementations of the invention described herein may have aspects that are wholly in hardware, partly in hardware and partly in software, as well as in software. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device.

Furthermore, the invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments. Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Additionally, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The terms "article of manufacture," "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, according to various permutations and combinations of the foregoing. Sub-components can also be implemented as components communicatively coupled to other components rather than included within parent components, e.g., according to a hierarchical arrangement. Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

What is claimed is:

1. A method, comprising:
   receiving, by a system including at least one processor, an indication of outdated channel state information for multiple-input multiple-output channels in a wireless network;

receiving an indication of a transmit power constraint for at least one consumer premise equipment (CPE);
for respective iterations of multiple iterations:
    determining a gradient based on the outdated channel state information;
    projecting the gradient onto the transmit power constraint;
    determining a linear precoder based on a result of the projecting to yield a current linear precoder;
    determining whether a difference between a first pairwise error probability of the current linear precoder and a second pairwise error probability of a previous linear precoder derived based on a result of a previous iteration is greater than a predetermined value; and
    performing a subsequent iteration of the determining the gradient, the projecting the gradient, and the determining the linear precoder in response to determining that the difference is greater than the predetermined value.

2. The method of claim 1, wherein the determining the gradient comprises utilizing a modified gradient algorithm.

3. The method of claim 2, wherein the projecting the gradient comprises performing a gradient projection of the modified gradient algorithm onto the transmit power constraint.

4. The method of claim 1, wherein the receiving the indication of the transmit power constraint for the at least one CPE comprises receiving data representative of transmit power constraints for multiple CPEs.

5. The method of claim 1, further comprising indicating the linear precoder to multiple CPEs.

6. The method of claim 1, wherein the determining the gradient and the projecting the gradient comprises determining the gradient and projecting the gradient at a base station of the wireless network.

7. The method of claim 1, further comprising solving a function subject to a condition of the indication of the transmit power constraint to minimize pairwise error probability.

8. The method of claim 7, wherein the solving comprises solving the function based on results from multiple CPEs in the wireless network.

9. The method of claim 1, wherein the determining the linear precoder comprises indicating the linear precoder for orthogonal space-time block coding.

10. An apparatus, comprising:
    a memory;
    at least one processor, communicatively coupled to the memory, configured to facilitate execution of computer-executable components, comprising:
        a channel state information component configured to receive an indication of outdated channel state information for a multiple-input multiple-output (MIMO) wireless network;
        a power constraint component configured to receive an indication of at least one power constraint for at least one device in the MIMO wireless network; and
        a precoder component configured to derive one or more precoders via a determination of a gradient as a function of the indication of outdated channel state information and a projection of the gradient onto the at least one power constraint,
        wherein the precoder component is further configured to perform a reiteration of the determination of the gradient and the projection of the gradient in response to a determination that a current pairwise error probability of the one or more precoders and a previous pairwise error probability of the one or more precoders prior to the determination and the projection differ by a value that is greater than a predetermined value.

11. The apparatus of claim 10, wherein the precoder component is further configured to determine precoders for respective multiple devices in the MIMO wireless network.

12. The apparatus of claim 10, wherein the precoder component is further configured to determine the gradient by determination of a solution of a function using a gradient descent algorithm.

13. The apparatus of claim 10, further comprising multiple receiving antennas and multiple transmitting antennas.

14. The apparatus of claim 10, wherein the power constraint component is further configured to receive the indication of the at least one transmit power constraint from the at least one device in the MIMO wireless network.

15. The apparatus of claim 10, further comprising a transmission component configured to transmit data in accordance with the one or more precoders.

16. The apparatus of claim 10, wherein the apparatus is a consumer premise equipment.

17. The apparatus of claim 10, wherein the apparatus is a base station.

18. An article of manufacture including a non-transitory computer-readable medium having instructions stored thereon that, in response to execution, cause a computing system to perform operations comprising:
    receiving outdated channel state information for space-time block coded multiple-input multiple-output channels in a wireless network;
    receiving transmit power constraint information associated with at least one consumer premise equipment;
    for respective iterations:
        deriving a gradient based on the outdated channel state information;
        projecting the gradient onto the transmit power constraint information;
        determining a current value of a parameter for a linear precoder subject to the transmit power constraint information based on a result of the projecting;
        determining whether a difference between a first pairwise error probability of the linear precoder with the current value of the parameter and a second pairwise error probability of the linear precoder with a previous value of the parameter determined prior to the deriving and projecting is greater than a predetermined difference; and
        performing another iteration of the deriving, the projecting, and the determining the current value in response to determining that the difference is greater than the predetermined difference.

19. The article of manufacture of claim 18, wherein the determining the current value comprises determining the current value for the at least one parameter for the linear precoder for orthogonal space time block coding.

20. The article of manufacture of claim 18, wherein the determining the current value comprises performing a gradient projection of a modified gradient algorithm onto the transmit power constraint information.

21. A system, comprising:
    a channel state information component of a device configured to receive outdated channel state information;
    a power constraint component of the device configured to receive an indication of at least one transmit power constraint; and
    a processing component of the device configured to, for a current iteration, determine a gradient as a function of the outdated channel state information, project the gradient onto the at least one transmit power constraint to yield a projection result, and update a linear precoding structure in accordance with the projection result,
wherein the processing component is further configured to perform a subsequent iteration in response to a determination that a difference between a pairwise error probability of the linear precoding structure after the current iteration and a previous pairwise error probability of the linear precoding structure prior to the current iteration is greater than a predetermined value.

22. The system of claim 21, wherein the processing component is further configured to determine the gradient and project the gradient onto the at least one power constraint for multiple iterations to determine the linear precoding structure.

23. The system of claim 22, wherein the processing component is further configured to iteratively update the linear precoding structure based on respective results of the multiple iterations.

24. The system of claim 21, wherein the processing component is further configured to determine a value for a variable of a set of variables comprising the linear precoding structure as a function of other variables of the set having respective fixed values.

25. A method, comprising:
receiving a first indication of outdated channel state information;
receiving a second indication of a transmit power constraint;
for respective iterations:
determining a gradient as a function of the first indication of the outdated channel state information;
projecting the gradient onto the second indication of the transmit power constraint;
solving a linear precoding structure based on an output of the projecting;
determining a difference between a pairwise error probability of the linear precoding structure and a previous pairwise error probability of the linear precoding structure prior to the determining the gradient and the projecting; and
performing a subsequent iteration of the determining the gradient, the projecting, and the solving in response to determining that the difference is greater than a predetermined value.

26. The method of claim 25, wherein the receiving the first indication comprises receiving the first indication from a component that estimates channel state information.

27. The method of claim 25, wherein the solving comprises using a distributed technique to solve for a closed-form linear precoding structure.

28. The method of claim 27, wherein the using the distributed technique comprises using the distributed technique at respective multiple consumer premise equipments.

29. The method of claim 27, further comprising performing orthogonal space-time block coding using the distributed technique.

30. An apparatus, comprising:
means for deriving a gradient based on received outdated channel state information associated with a device in communication with a base station;
means for projecting the gradient onto a transmit power constraint associated with the device;
means for forming a linear precoder, having a current pairwise error probability, as a function of a result generated by the means for projecting; and
means for reiterating the deriving, the projecting, and the forming in response to determining that a difference between the current pairwise error probability and a previous pairwise error probability of the linear precoder is greater than a predetermined value.

31. The apparatus of claim 30, further comprising means for receiving the outdated channel state information from the device.

32. The apparatus of claim 30, further comprising means for using distributed processing to derive a closed-form linear precoding structure.

33. The method of claim 1, wherein the receiving the indication of the outdated channel state information comprises receiving the indication of the outdated channel state information corresponding to a previous time slot relative to a time slot for which the linear precoder is to be used.

34. The apparatus of claim 10, wherein the outdated channel state information corresponds to a first time slot, and the precoder component is configured to derive the one or more precoders for a second time slot by solving a function dependent on the indication of the outdated channel state information, wherein the second time slot is later than the first time slot.

35. The article of manufacture of claim 18, wherein the receiving the outdated channel state information comprises receiving the outdated channel information corresponding to an earlier time slot than a time slot for which the at least one parameter is calculated.

36. The system of claim 21, further comprising a transmission component configured to transmit the linear precoding structure to at least one consumer premise equipment.

37. The system of claim 21, wherein the outdated channel state information corresponds to a first time slot, and the processing component is further configured to determine the linear precoding structure for a second time slot based on the outdated channel state information, wherein the second time slot is subsequent to the first time slot.

38. The method of claim 25, further comprising transmitting data based on the linear precoding structure.

39. The method of claim 25, wherein the receiving the first indication comprises receiving the first indication of the outdated channel state information corresponding to a first timeslot, and the solving the linear precoding structure comprises solving the linear precoding structure for a second timeslot subsequent to the first time slot.

40. The system of claim 23, wherein the controller is further configured to terminate the multiple iterations in response to a determination that the difference is less than the predetermined value.

* * * * *

UNITED STATES PATENT AND TRADEMARK OFFICE
CERTIFICATE OF CORRECTION

PATENT NO. : 8,223,626 B2  Page 1 of 3
APPLICATION NO. : 11/972980
DATED : July 17, 2012
INVENTOR(S) : Au et al.

It is certified that error appears in the above-identified patent and that said Letters Patent is hereby corrected as shown below:

On the Title Page, in Item (57), under "ABSTRACT", in Column 2, Line 12, delete "preceding" and insert -- precoding --, therefor.

In the Specification

In Column 2, Line 3, delete "preceding" and insert -- precoding --, therefor.

In Column 2, Lines 4-5, delete "preceding" and insert -- precoding --, therefor.

In Column 2, Line 10, delete "preceding" and insert -- precoding --, therefor.

In Column 3, Line 19, delete "(e.g," and insert -- (e.g., --, therefor.

In Column 3, Line 27, delete "preceding" and insert -- precoding --, therefor.

In Column 3, Line 43, delete "packets $120_{1-L}$" and insert -- packets --, therefor.

In Column 3, Line 61, delete "$120_{1-L}$ for" and insert -- for --, therefor.

In Column 5, Line 32, delete "A(C,Ĉ)" and insert -- $A(C,\overline{C})$ --, therefor.

In Column 5, Line 38, delete "preceding" and insert -- precoding --, therefor.

In Column 5, Line 49, delete "Ĉ" and insert -- $\overline{C}$ --, therefor at each occurrence throughout the specification.

Signed and Sealed this
Seventh Day of January, 2014

Margaret A. Focarino
*Commissioner for Patents of the United States Patent and Trademark Office*

CERTIFICATE OF CORRECTION (continued)
U.S. Pat. No. 8,223,626 B2

In Column 5, Line 64, delete "$(d_m/P_S)I_{M_TT}$" and insert -- $(d_m/P_S)I_{M_TL}$ --, therefor.

In Column 6, Line 6, delete "preceding" and insert -- precoding --, therefor.

In Column 6, Line 8, delete "preceding" and insert -- precoding --, therefor.

In Column 5, Line 32, delete "A(C,Ĉ)" and insert -- $\mathbf{A}(\mathbf{C}, \overline{\mathbf{C}})$ --, therefor.

In Column 5, Line 38, delete "preceding" and insert -- precoding --, therefor.

In Column 5, Line 49, delete "Ĉ" and insert -- $\overline{\mathbf{C}}$ --, therefor at each occurrence throughout the specification.

In Column 5, Line 64, delete "$(d_m/P_S)I_{M_TT}$" and insert -- $(d_m/P_S)I_{M_TL}$ --, therefor.

In Column 6, Line 6, delete "preceding" and insert -- precoding --, therefor.

In Column 6, Line 8, delete "preceding" and insert -- precoding --, therefor.

In Column 6, Line 23, in (Equation 8), delete "$A_1(C_1, \overline{C})$" and insert -- $\mathbf{A}_1(\mathbf{C}_1, \overline{\mathbf{C}}_1)$ --, therefor.

In Column 7, Line 22, delete "preceding" and insert -- precoding --, therefor.

In Column 8, Line 1, delete "preceding" and insert -- precoding --, therefor.

In Column 8, Lines 16-17, delete "$F^{(l)} \underline{\Delta} \text{diag}$" and insert -- $\mathbf{F}^{(l)} \triangleq \text{diag}$ --, therefor.

In Column 8, Line 39, in (Equation 18), delete "$\mu_i F_i^{(l)} = \nabla_{F_i}(F^{(l)}, C, \overline{C}) =$" and insert -- $\mu_l \mathbf{F}_l^{(l)} = \nabla_{\mathbf{F}_l} l(\mathbf{F}^{(l)}, \mathbf{C}, \overline{\mathbf{C}}) =$ --, therefor.

In Column 9, Line 29, delete "preceding" and insert -- precoding --, therefor.

In Column 9, Line 40, delete "preceding" and insert -- precoding --, therefor.

In Column 10, Line 11, delete "preceding" and insert -- precoding --, therefor.

CERTIFICATE OF CORRECTION (continued)
U.S. Pat. No. 8,223,626 B2

In Column 10, Line 56, delete " $\Sigma H_{1H_1|\hat{H}_1}$ ," and insert -- $\Sigma_{H_l,H_l|\hat{H}_l}$, -- therefor.

In Column 11, Line 22, delete "preceding" and insert -- precoding --, therefor.

In Column 12, Line 5, in (Equation 31), delete " $F_i = U_{M_{H_i \hat{H}_i}} \hat{\Lambda}_{F_i}$ " and insert -- $F_i = U_{M_{H_l|\hat{H}_l}} \overline{\Lambda}_{F_l}$ --, therefor.

In Column 12, Line 7, delete "preceding" and insert -- precoding --, therefor.

In Column 12, Line 6, delete " $\hat{\Lambda}_{F_i}$ " and insert -- $\overline{\Lambda}_{F_l}$ --, therefor.

In Column 13, Line 63, delete "preceding" and insert -- precoding --, therefor.

In Column 14, Line 7, delete "preceding" and insert -- precoding --, therefor.

In Column 14, Line 43, delete "components/hardware" and insert -- components/hardwares --, therefor.

In Column 14, Line 63, delete "preformed" and insert -- performed --, therefor.